United States Patent
Bongaarts et al.

(10) Patent No.: US 11,108,880 B2
(45) Date of Patent: Aug. 31, 2021

(54) TELECOMMUNICATIONS-NETWORK CONTENT CACHING

(71) Applicant: T-Mobile USA, Inc., Bellevue, WA (US)

(72) Inventors: Paul Bongaarts, Issaquah, WA (US); Andrew Gapin, Seattle, WA (US); Otto Fonseca Escudero, Snoqualmie, WA (US); Elisa Hwei-Shan Yuen, Seattle, WA (US); Marie Grace Jacinto, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 221 days.

(21) Appl. No.: 16/174,597

(22) Filed: Oct. 30, 2018

(65) Prior Publication Data

US 2019/0132414 A1    May 2, 2019

Related U.S. Application Data

(60) Provisional application No. 62/578,976, filed on Oct. 30, 2017.

(51) Int. Cl.
*H04L 29/08* (2006.01)
*G06N 3/02* (2006.01)
(Continued)

(52) U.S. Cl.
CPC ...... *H04L 67/2847* (2013.01); *H04L 67/2852* (2013.01); *G06N 3/02* (2013.01);
(Continued)

(58) Field of Classification Search
CPC . H04L 67/2847; H04L 67/2852; G06Q 30/00; G06Q 30/0251; H04N 21/4756; H04N 21/4586; H04N 21/4622
See application file for complete search history.

(56) References Cited

U.S. PATENT DOCUMENTS 9,843,649 B1 * 12/2017 Hampson ........... G06Q 30/0264
10,389,776 B2 * 8/2019 Brown ................. H04L 67/146
(Continued)

OTHER PUBLICATIONS

"Downloading on Netflix Just Got Smarter", Jul. 10, 2018, retrieved on Oct. 30, 2018 from <<https://media.netflix.com/en/company-blog/downloading-on-netflix-just-got-smarter-1>>, 1 page.
(Continued)

*Primary Examiner* — Aftab N. Khan
(74) *Attorney, Agent, or Firm* — Lee & Hayes, P.C.

(57) ABSTRACT

A telecommunication system can include a control device and a network gateway. The control device can determine cache-update instructions by operating trained computational models. The network gateway can receive cache-update instructions from the control device and transmit corresponding items of content to network terminals. In some examples, the network terminals can receive the items of content and store them in respective content caches at the at the network terminals. In some examples, the control device can determine respective content scores for at least two items of content; cluster the at least two items of content based at least in part on usage data associated with the network terminals to determine respective cluster labels for the at least two items of content; and determine the cache-update instructions based at least in part on the content scores, the cluster labels, and network-resource information.

20 Claims, 10 Drawing Sheets

(51) Int. Cl.
*H04N 21/475* (2011.01)
*H04N 21/458* (2011.01)
*H04N 21/462* (2011.01)

(52) U.S. Cl.
CPC ..... *H04N 21/4586* (2013.01); *H04N 21/4622* (2013.01); *H04N 21/4756* (2013.01)

(56) References Cited

U.S. PATENT DOCUMENTS

| | | | | |
|---|---|---|---|---|
| 2009/0187939 | A1* | 7/2009 | Lajoie | H04N 7/17318 |
| | | | | 725/34 |
| 2011/0213655 | A1* | 9/2011 | Henkin | G06Q 30/0251 |
| | | | | 705/14.49 |
| 2012/0254188 | A1* | 10/2012 | Koperski | G06F 16/9535 |
| | | | | 707/740 |
| 2017/0011029 | A1* | 1/2017 | Chatterjee | G06F 16/35 |
| 2017/0244999 | A1* | 8/2017 | Chen | G06F 16/48 |
| 2017/0257452 | A1* | 9/2017 | Hoiles | H04L 67/2842 |
| 2017/0374121 | A1* | 12/2017 | Phillips | H04N 21/26258 |
| 2018/0082325 | A1* | 3/2018 | Kitts | G06Q 30/0242 |
| 2018/0137203 | A1* | 5/2018 | Hennekey | G06F 16/9535 |
| 2019/0028492 | A1* | 1/2019 | Coleman | G06F 3/0481 |
| 2019/0342419 | A1* | 11/2019 | Bromand | H04N 21/2402 |
| 2020/0305042 | A1* | 9/2020 | Alam | H04W 28/06 |

OTHER PUBLICATIONS

"LTE Evolved Multimedia Broadcast Multicast Services (eMBMS)", 2015, retrieved Oct. 30, 2018 from <<https://www.viavisolutions.com/en-us/literature/lte-evolved-multimedia-broadcast-services-embms-white-paper-en.pdf>>, 16 pages.

"Nearest-neighbor chain algorithm", Wikipedia, Aug. 6, 2017, retrieved Oct. 10, 2018, from <<https://en.wikipedia.org/w/index.php?title=Nearest-neighbor_chain_algorithm&oldid=794221011>>, 7 pages.

"Netflix Open Connect Appliance Deployment Guide", Oct. 8, 2018, retrieved Oct. 17, 2018 from <<https://openconnect.netflix.com/en/deploymentguide.html#fill-updates-and-maintenance>>, 35 pages.

\* cited by examiner

TELECOMMUNICATIONS-NETWORK CONTENT CACHING

CROSS-REFERENCE TO RELATED APPLICATIONS

This application is a nonprovisional application of, and claims priority to and the benefit of, U.S. Patent Application Ser. No. 62/578,976, filed Oct. 30, 2017, and entitled "Mobile Device Wireless Network Edge Content Staging," the entirety of which is incorporated herein by reference.

BACKGROUND

A computing device configured for telecommunications, such as a wireless phone, can receive data in a variety of ways. The data can be sent unicast, or "end-to-end," in which data is sent by a provider (e.g., a digital content provider on the Internet) and routed through the Internet to a cellular core network, and then directly to the end user. When multiple users request the same data from the same cell site at substantially the same time, or request a live stream, however, the data can be sent by the provider, through the Internet and the cellular core network, and broadcast to multiple users at the same time. In other words, though the data is being sent to multiple users, it need only be transmitted once by a particular cell site.

Wireless broadcast is an efficient method to deliver data to multiple users, compared with sending wireless unicast transmissions to each user individually. Technologies such as Evolved Multimedia Broadcast Multicast Services (eM-BMS) and Long-Term Evolution Broadcast (LTE-B) leverage Internet Protocol (IP) multicast in the transport network to quickly replicate data packets from a content provider server towards the cell site, or wireless base station (WBS), e.g., an eNodeB or gNodeB.

Content delivery consumes an increasing amount of bandwidth as time goes on. For example, the increasing delivery of video by Internet-based streaming instead of by terrestrial broadcast or cable operators has added considerably to the load on Internet-connected networks in recent years. To increase efficiency in transmission of data to multiple users upstream of a WBS, various Content Delivery Network (CDN) services maintain copies of popular data at various locations closer (in the network) to users than are the content providers' servers. For example, NETFLIX operates a CDN called "Netflix Open Connect" that stores video content at "Open Connect Appliances" (OCAs) co-located at user-facing Internet Service Providers (ISPs). The stored content is then served directly by the ISPs rather than by the content provider via the ISPs.

For brevity, the term "originator" is used herein to refer to a party that provides content, e.g., NETFLIX, or to network device(s) or connection(s) operated by such a party to provide content. The term "distributor" is used herein to refer to a party, such as an ISP, cellular carrier, or other wireless or wired consumer-facing network operator, that receives content via a backhaul and provides that content to user(s) terminal(s), or to network device(s) or connection(s) operated by such a party for that purpose. In some examples, the originator and the distributor are the same party.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. The figures are not necessarily to scale.

For brevity of illustration, in the diagrams herein, an arrow beginning with a diamond connects a first component or operation (at the diamond end) to at least one second component or operation that is or can be included in the first component or operation in at least one example. An arrow marked "(o)" denotes an optional relationship, i.e., a relationship that is present in some examples and absent in some examples.

DETAILED DESCRIPTION

Overview

Figure 1:
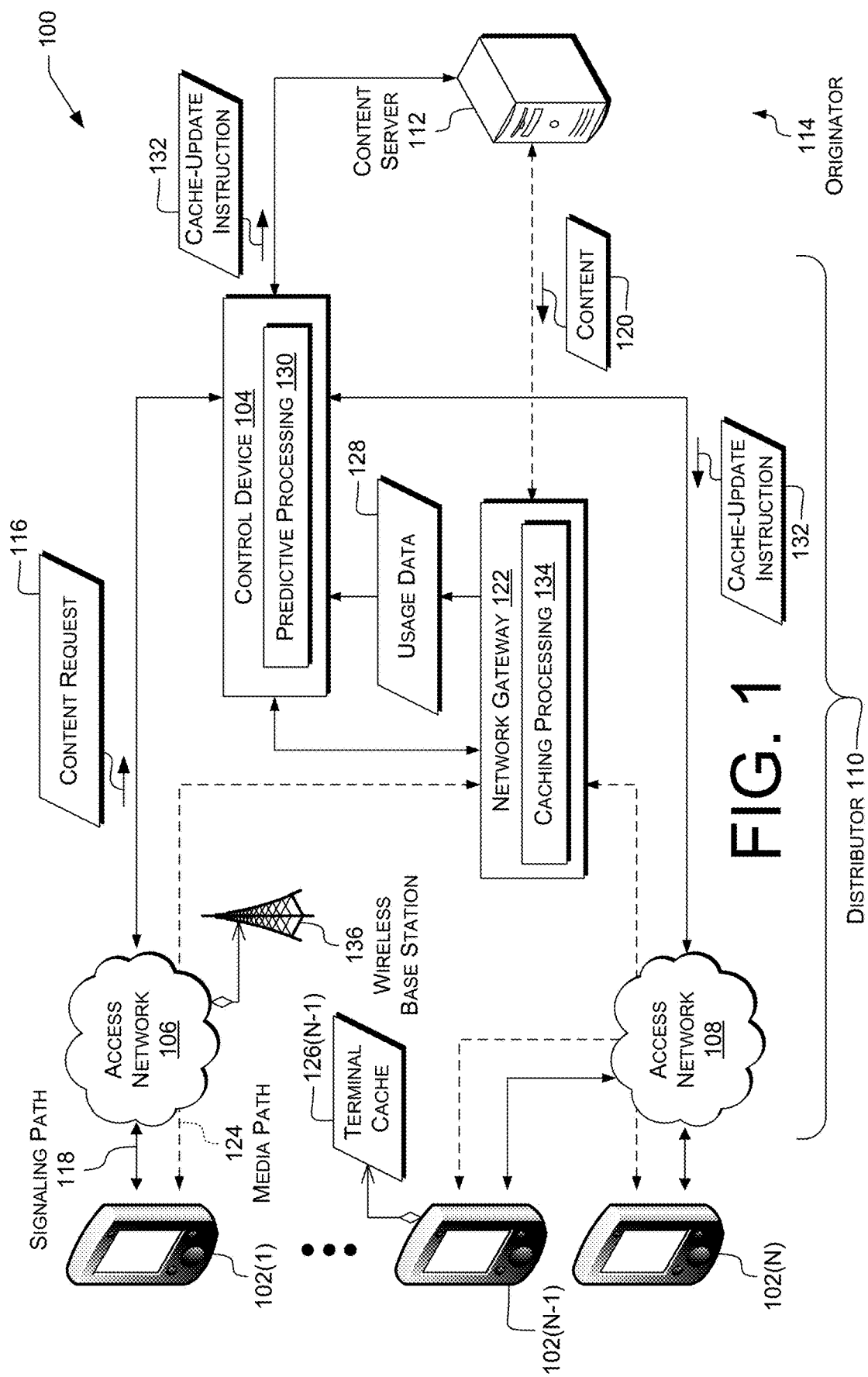
FIG. 1 is a block diagram illustrating a telecommunication system for implementing transmission of content to terminal caches according to some implementations.

CDNs placed within a distributor's network can serve content without involving the originator, reducing backhaul bandwidth consumption between the originator and the distributor. This can reduce buffering and jitter when content (e.g., HD video) is consumed at a terminal, which can improve the experience of the end user. This can also reduce overall network load, particularly peering or interconnection load.

However, some prior CDNs are only usable with terminals that are connected to the distributor at the time content is being viewed. Examples include NETFLIX OCAs located at a serving cellular network. For many mobile users, content consumption can be interrupted by transient signal degradation (e.g., multipath fading or movement into a tunnel). Content consumption may also be unavailable if a terminal is out of range of a wireless network providing sufficient bandwidth. Therefore, these prior CDNs may not provide users the ability to access reliable video-on-demand or other content-on-demand services.

Moreover, some distributors do not support IP multicast or wireless broadcast. Therefore, concurrent consumption of popular content at a large number of terminals may be carried out via multiple concurrent unicast streams of the same content, causing high network loads on the wireless link between a WBS and terminals attached thereto during the period of unicast. This load may require reducing content quality (e.g., downgrading to SD video), and can render the network more vulnerable to streaming disruptions such as buffering.

Various examples provide improved distribution of content to terminals and caching of content at those terminals. Various examples can reduce network load, increase the number of concurrent users that can be served by the network, permit users to access content while out of range of a network, reduce the occurrence of streaming disruptions, or provide an improved user experience for content consumption on a terminal, such as a smartphone or other wireless device. In some examples, the distributor caches, at a particular terminal, content predicted to be later consumed at a terminal. For example, content can be sent to terminal(s) during times of light network load to reduce the load due to concurrent consumption of popular content. Content that is cached in its entirety on a terminal can be consumed on that terminal with substantially no network load, or when out of range of a network.

As used herein, a "terminal" is a communication device, e.g., a cellular telephone or other user equipment (UE), configured to perform, or intercommunicate with systems configured to perform, techniques described herein. Terminals can include, e.g., wireless voice- or data-communication devices. Terminals can also include set-top boxes (STBs) and other fixed devices that receive content, e.g., via wireless or wired connections, and replay that content through a television, stereo, or other light- or sound-producing device. A terminal can include a user interface (e.g., as does a smartphone), but is not required to. For example, a streaming server configured to provide audio or visual content on demand can be a terminal. Such a terminal may not include a user interface, instead relying on interfaces at other terminals to form queries and send those queries to the server.

As used herein, a "terminal cache" is at least a portion of at least one computer-readable medium that is part of, or is mechanically and communicatively connected with, a terminal. The terminal cache is configured to store content received from the distributor and provide that content to authorized apps or other software. The terminal cache and associated software or firmware can permit the terminal to serve as a node in a CDN, in some examples.

The term "session" as used herein includes a communications path for uni- or bi-directional exchange of data among two or more terminals. Example sessions include voice and video calls, e.g., by which human beings converse, a data communication session, e.g., between two electronic systems or between an electronic system and a human being, or a Rich Communication Services (RCS) session. An example of a session can be, e.g., a voice-over-Internet Protocol (IP), or "VoIP," call from a Web browser or tablet application using Opus via a WebRTC gateway to an IP Multimedia Subsystem (IMS) subscriber, or vice versa.

Various types of content and content items are described herein. Throughout this document, "video" includes moving-picture data and also audiovisual content, e.g., moving-picture data, soundtrack data, and synchronization data (if required by a particular audiovisual file format). Moreover, throughout this document, "video" includes two-dimensional image content (e.g., traditional images) and three-dimensional image content (e.g., for stereoscopic viewing or for immersive virtual-reality, VR, use cases). In some VR use cases, VR content includes geometry data in addition to or instead of pre-recorded video content. In some augmented-reality (AR) use cases, AR content includes data of an AR overlay, e.g., a content item (such as video, audio, or VR geometry) along with presentation data indicating when, where, or how that content item should be presented with respect to the real world. For example, the presentation data can indicate that the item of content (e.g., image, sound, or geometry) should be presented as if physically present at (for sounds, physically emitted from a device located at) a given latitude/longitude. Additionally or alternatively, the presentation data can indicate that the item of content should be displayed whenever a barcode is visible to a camera, and that the item of content should be displayed in a predetermined spatial relation to the barcode (e.g., for a virtual pop-up book).

The term "packet" is used herein to refer generally to data packets, frames, datagrams, or any other identifiable units of data that include a header and a payload and that are transmitted or received via a communication network. Throughout this document, discussions of transmissions, e.g., of packets, from specified origins or to specified destinations can include any number, zero or more, of intervening network devices, unless otherwise expressly specified.

As used herein, the term "unique identifier" and similar terms encompass both truly unique identifiers (e.g., Ethernet MAC addresses that are unique by construction, or Version 1 UUIDs) and identifiers with a negligible probability of collision (non-uniqueness) (e.g., SHA256 hashes of data uniquely identifying an object, or Version 4 UUIDs).

As used herein, a "random" value can be a truly random value, e.g., measured from physical phenomena, or a pseudorandom value. Examples of random values include cryptographically-strong random numbers.

Various examples include at least one of the following: performing CDN functions at an end user device (e.g., LTE User Equipment or another terminal); populating a terminal's CDN cache with content, time-shifted, which can reduce the cost to deliver the content over a wireless network (e.g., fill during off-peak times); using wireless broadcast to locally fill device-level CDN caches within geographic proximity to each other (e.g., concurrently filling multiple terminal caches attached to a particular WBS using a wireless broadcast from that WBS); using usage data to select content to be stored in a device's CDN cache (e.g., based on content size, likelihood of content consumption in a particular time span, or other factors); or separating the memory storage of a terminal into dedicated storage for a CDN cache and general storage for the operating system and user data.

Various examples permit users to watch what they want, when they want, where they want. Loading content into terminal caches in various examples described herein can permit consuming content even while out of range of a network. Various examples permit transmitting higher-quality time-shifted media, avoiding quality downgrades that might otherwise have to be applied to fit streamed media within available network bandwidth, e.g., at times of high demand from multiple concurrent users.

Various examples that transfer updates as content to terminal caches can permit delivering updates more effectively, and with reduced network load. This can reduce the average time between when an update is made available and when it is installed, which can improve security of apps or other software on mobile devices.

In some examples, when the content a user wants to consume is already stored in a terminal cache, it does not consume wireless network resources at the time of consumption. This can reduce the user-perceived latency in retrieving the content, and removes negative effects of network congestion or other network-related factors from the delivery of the content. This can, in turn, improve the user experience of consuming the content (e.g., reduce user-perceptible interruptions due to buffering, or permit viewing when out of network range).

In some examples, content consumed during peak times can be retrieved by the network in off-peak times. Caching content in terminal caches, and time-shifting the transfer of the content ahead of the presentation time of the content, can substantially reduce the cost and network resource requirements of, and network congestion that might otherwise be introduced by, content delivery. In some examples, wireless broadcast (time-shifted or not) can also reduce the cost and network resource requirements of, and network congestion that might otherwise be introduced by, content delivery.

Various examples of time-shifted or MBMS FOTA or other update delivery can increase compliance with updates, reduce the user-perceived time required to update, and reduce the overall time required time to upgrade a population of terminals.

This "Overview" section is intended only to provide a brief overview of subject matter disclosed herein according to one or more illustrative embodiments, and does not serve as a guide to interpreting the claims or to define or limit scope. This section is provided to introduce illustrative features in a simplified form; these features are further described below. This section is not intended to identify key features or essential features of the claimed subject matter, nor is it intended to be used as an aid in determining the scope of the claimed subject matter. The claimed subject matter is not limited to implementations that solve any or all disadvantages noted above. The claimed subject matter is not limited to implementations that provide at least one of the results listed herein.

Illustrative Configurations

FIG. 1 is a block diagram illustrating a telecommunication system 100 according to some examples. The system includes terminals 102(1)-102(N) (individually or collectively referred to herein with reference 102), N≥1. A terminal 102 may be or include a cellular phone or other type of terminal such as those described above. The terminals 102 are communicatively connected to a control device 104, e.g., via access networks 106 and 108. In the illustrated example, terminal 102(1) is connected via access network 106 and terminals 102(N-1) and 102(N) are connected via access network 108, but this is not limiting. The control device 104 can include, e.g., a Telephony Application Server (TAS) or other application server (AS), e.g., of an IMS network. Additionally or alternatively, the control device can include an anchoring network device such as an Access Transfer Control Function (ATCF) of an IMS in a VoLTE-capable network. The terminals 102 can additionally or alternatively communicate with each other.

Access networks 106 and 108, control device 104 are components of a distributor's network ("distributor") 110 in the illustrated example. In other examples, the distributor's network 110 includes 3G, GPRS, LTE, 5G, wired, or other types of network connections. Techniques described herein with reference to cellular communications can additionally or alternatively be used on other types of connections. Moreover, techniques described herein with reference to a distributor such as a network operator can additionally or alternatively be used by an over-the-top distribution system including, e.g., a content-distribution app operated by a party other than a network operator.

Distributor 110 transfers content from a content server 112 of an originator's network ("originator") 114 to terminal(s) 102. In the illustrated example, terminal 102(1) requests content by sending a content request 116 to or via control device 104. For example, the content request 116 can include an IP transmission to content server 112 requesting the content, and control device 104 can forward the IP transmission. Additionally or alternatively, the content request 116 can include a request to create a bearer or other channel via which terminal 102(1) can communicate directly with content server 112. The content request 116 can be sent via a signaling path 118.

The content server 112 can represent servers, clouds of servers, or other computational devices used to transmit podcasts, streaming content, or other content, via the Internet or another network. The content server 112 can be operated by an originator different from the distributor (such as, for example, YOUTUBE, or TV-streaming sites such as HULU). Additionally or alternatively, the content server 112 can be operated by the distributor. The content server 112 can also comprise components of the distributor 110's network configured to download content from third-party servers to make the content available within distributor 110's network, e.g., as discussed herein with reference to network gateway 122 or FIGS. 7-9.

In response to the content request 116, on request of the control device 104, or at other times, content server 112 provides content 120 to a network gateway 122, e.g., an LTE packet data network (PDN) gateway (PGW). The network gateway 122 then provides the content 120 via a media path 124 to terminal(s) 102, e.g., streamed for immediate consumption, or for storage in a respective terminal cache 126($i$) of terminal 102($i$). Signaling path 118 and media path 124 can represent different packet flows along a common network, along different networks, or any combination thereof. As shown, content server 112 can communicate via signaling path 118 or media path 124, in some examples. Solely for clarity of the diagram, terminal caches 126 are not shown at terminals 102(1) and 102(N). In some examples, media path 124 can carry guaranteed bit-rate (GBR) traffic while streaming content 120 for immediate consumption. In some examples, media path 124 can carry non-GBR traffic while transferring content 120 into a terminal cache 126.

In some nonlimiting examples using various techniques herein, content 120 can include at least: pre-recorded media programs (e.g., for television, film, or radio), e.g., sitcom episodes that broadcast at a specific time but are downloaded earlier and locked until the broadcast time; commercial messaging; viral videos; or collections of content items such as full seasons of sitcoms or dramas.

In some examples, content request 116 or other signaling ("control-plane") traffic (e.g., packets conveying instructions to set up or tear down a session) can be formatted using the Session Initiation Protocol (SIP, RFC 3261). However, this is not limiting, and other signaling protocols and techniques can be used with, or to implement, functions described herein. In some examples, signaling traffic of a communication session, e.g., SIP requests and responses or other signaling traffic, may pass to or through control device 104 or other proxies, user-agent servers or clients, or back-to-back user agents (B2BUAs).

In some examples, media path 124 (e.g., carrying RTP or other-protocol media) can pass through network gateway 122. For example, the network gateway 122 can include an Access Transfer Gateway (ATGW), e.g., of an originating or terminating IMS. As used herein, the term "network gateway" can indicate, but does not require that, network gateway 122 connects two different networks. Network gateway 122 can be configured to pass traffic between different networks or between different terminals in a particular network, in some nonlimiting examples. In some examples, control device 104, managing the control plane, communicates with network gateway 122, managing the user plane, via a gateway control protocol or third-party call control protocol. Examples include H.248 ("MEGACO"), VoiceXML, or the Media Server Markup Language (MSML).

In some examples, content server 112 can be a video or audio server (e.g., supporting bulk or streaming transfers), a multi-party audio- or video-conferencing server, a real-time information server such as a stock-price server, a VR or AR-overlay server, or an exchange server that receives images, text, banners, or other items of content 120 from content providers and selectively distributes those items to terminals 102. In some examples of exchange servers, content server 112 is configured to select the item(s) of content to be distributed in response to a content request based at least in part on information associated with the requesting terminal 102. Additionally or alternatively, content server 112 can be an update server configured to deliver over-the-air (OTA) updates to terminal(s) 102. Such updates can include, e.g., updates to smartphone or STB operating-system software or apps, or updates to firmware or configuration parameters of a terminal 102. In some examples, content 120 can include in-vehicle firmware for vehicle-to-X (V2X) communications, or firmware or software for Internet of Things (IoT) devices. In some examples, an item of content 120, e.g., a firmware or OS update, can have a size between about 20 MB and about 1.4 GB.

Content server 112 can be an example of a terminal 102, as noted above. Content server 112 can be or include a mobile device, or can be or include a device not designed for mobility, such as a rack-mounted server. For brevity, only one content server 112 is shown. However, terminal(s) 102, control device(s) 104, or network gateway(s) 122 can interact with multiple content servers 112. Content server 112 can comprise a single server or one or more clouds of servers, ASICs, FPGAs, tablet computers, laptops, or other electronic devices, in various examples.

In some examples, content server 112 can be operated by originator 114 in originator 114's facility. Content server 112 can be connected with network gateway 122, e.g., via the Internet (e.g., via a VPN or other tunnel, or directly via TCP, UDP, or SCTP), a leased line, or another inter-facility link. Additionally or alternatively, content server 112 can be co-located in distributor 110's facility (e.g., a NETFLIX OCA). Content server 112 can be connected with network gateway 122 via dedicated link(s) in a machine room or other components of distributor 110's network.

In some examples, network gateway 122 provides to control device 104 usage data 128 representing content consumption or terminal location, discussed below. Usage data 128 can be collected, e.g., with the consent of the pertinent user(s), or in an anonymized way (e.g., without respect to user identity), in some examples. For example, network gateway 122 can provide usage data 128 at least periodically, at random time intervals, upon call-status events such as call setup or teardown, or upon request from control device 104. Additionally or alternatively, control device 104 can collect its own usage data 128. Additionally or alternatively, control device 104 can request or receive usage data 128 from content server 112.

The control device 104 receives the usage data 128 and performs predictive processing 130 based thereupon, e.g., as described below with reference to FIG. 5-8 or 10. In some examples, the predictive processing 130 selects specific content items to be added to or removed from terminal cache(s) 126. The control device 104 then sends cache-update instructions 132 to content server 112, network gateway 122, or terminal(s) 102 to update the terminal cache(s) 126 accordingly. Functions at network gateway 122 to collect or report usage data 128, or to receive and respond to cache-update instructions 132, are represented collectively as caching processing 134.

In some examples, in a push model, control device 104 can send cache-update instructions 132 to content server 112 to push specific content 120 to particular terminal(s) 102. Additionally or alternatively, in a push-to-terminal model, control device 104 can send cache-update instructions 132 to network gateway 122 to retrieve specific content 120 from content server 112 and push that content 120 to particular terminal(s) 102. Additionally or alternatively, in a pull model, control device 104 sends cache-update instructions 132 to particular terminal(s) 102 to retrieve particular content 120 from content server 112. Additionally or alternatively, control device 104 can send cache-update instructions 132 to access network(s) 106, 108, e.g., to a WBS thereof such as an eNodeB or a gNodeB. For brevity, only one WBS 136 is shown. Cache-update instructions 132 can indicate a plurality of terminals 102 connected to a particular WBS 136, and a WBS 136 receiving a cache-update instruction 132 can transmit specific content 120 via wireless broadcast to multiple terminals 102 substantially concurrently.

The terminals 102 may be implemented as any suitable computing devices configured to communicate over a wireless and/or wireline network, including, without limitation, a mobile phone (e.g., a smartphone or feature phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the terminals 102 as being "mobile" or "wireless," (e.g., configured to be carried and moved around, or embodied in or designed for use in a vehicle), it is to be appreciated that the terminals 102 may represent various types of communication devices that are generally stationary as well, such as televisions, desktop computers, game consoles, set top boxes, and the like. In this sense, the terms "communication device," "wireless device," "wireline device," "mobile device," "computing device," "terminal," "user equipment," and "UE" may be used interchangeably herein to describe any communication device capable of performing the techniques described herein. In some examples, terminal 102 can be, or be part of, an automotive entertainment system or other in-vehicle communication device. For example, techniques herein can be used to store feature films or other video or audio content the night before a long car trip for consumption during the trip.

In some examples, the functions of control device 104 and network gateway 122 can be combined or otherwise integrated into a network gateway system such as a VoIP-PSTN gateway, WebRTC gateway, Interconnect Session Border Controller (ISBC), Media Gateway (MGW), Breakout Gateway Control Function (BGCF), or ATGW. These functions can additionally or alternatively be carried out by separate, intercommunicating control devices 104 and network gateways 122.

Figure 2:
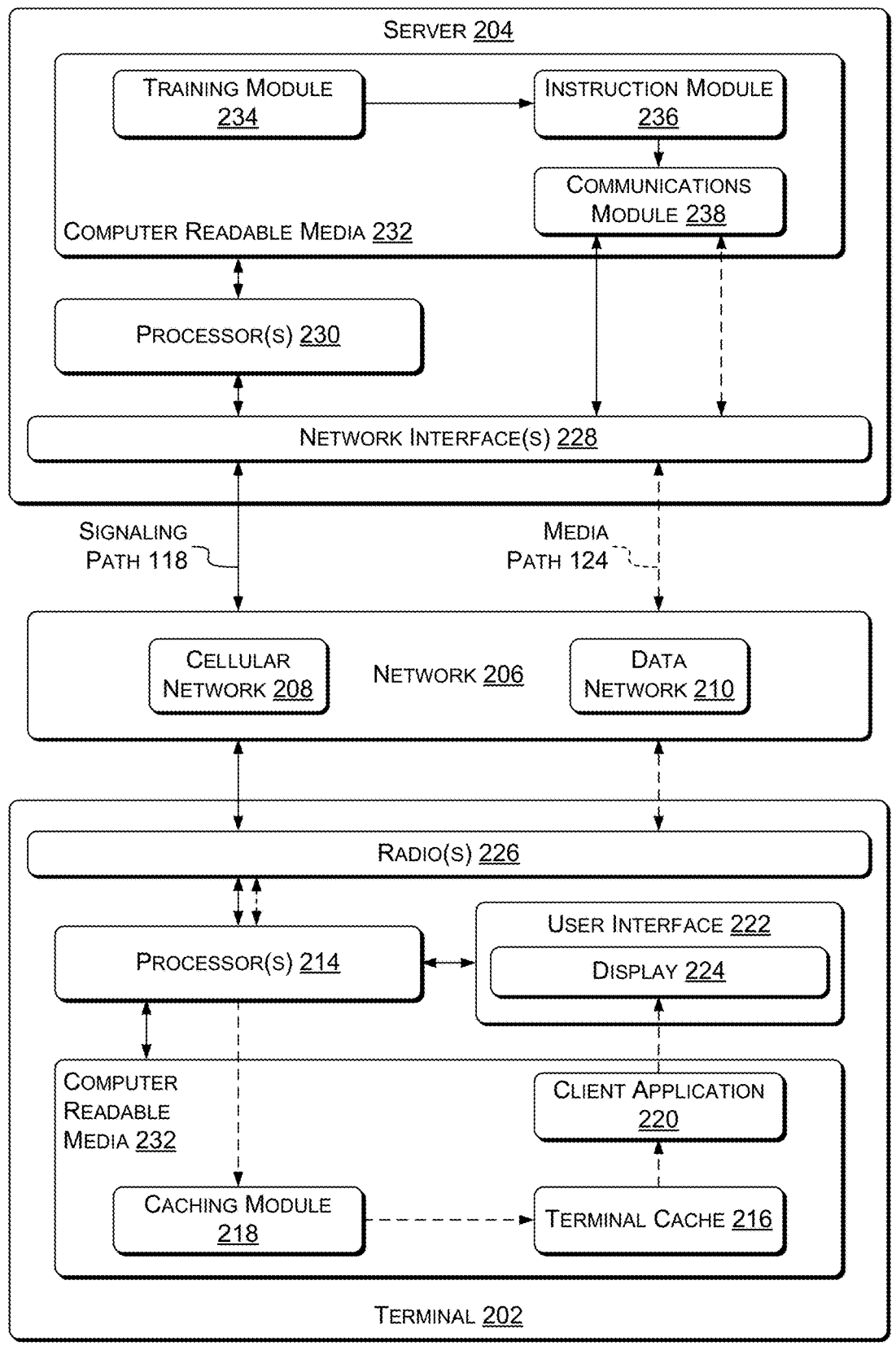
FIG. 2 is a block diagram illustrating a system for implementing content caching according to some implementations.

FIG. 2 is a block diagram illustrating a telecommunication system 200 permitting content management according to some implementations. The telecommunication system 200 includes a terminal 202, which can represent terminal 102, coupled to a server 204 via a network 206. The server 204 can represent control device 104, network gateway 122, or both. The network 206 can include one or more networks, such as a cellular network 208 and a data network 210. The network 206 can include one or more core network(s) connected to user equipment via one or more access network(s), e.g., access networks 106 or 108. At least one of terminal 202 or server 204 can communicate via network 206 with another terminal or other device, e.g., terminal 102 or content server 112 (omitted for brevity). As in FIG. 1, dashed lines represent media path 124.

Terminal 202 can include one or more computer readable media (CRM) 212, such as memory (e.g., random access memory (RAM), solid state drives (SSDs), or the like), disk drives (e.g., platter-based hard drives), another type of computer-readable media, or any combination thereof. The CRM 212 can be used to store data and to store instructions that are executable by one or more processors 214 of terminal 202 to perform various functions as described herein. The CRM 212 can store various types of instructions and data, such as an operating system, device drivers, etc. The processor-executable instructions can be executed by the processors 214 to perform the various functions described herein.

The CRM 212 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 214. Tangible computer-readable media can include volatile and nonvolatile, removable and non-removable media implemented in any method or technology for storage of information, such as computer readable instructions, data structures, program modules, or other data.

The one or more processors 214 can include, e.g., one or more processor devices such as microprocessors, microcontrollers, central processing units (CPUs), graphics processing units (GPUs), general-purpose GPUs (GPGPUs), field-programmable gate arrays (FPGAs), application-specific integrated circuits (ASICs), Application-Specific Standard Products (AS SP), System-On-a-Chip systems (SoCs), programmable logic devices (PLDs), programmable logic arrays (PLAs), programmable array logic devices (PALs), or digital signal processors (DSPs).

The CRM 212 can store a terminal cache 216, which can represent terminal cache 126. In some examples, terminal cache 126 can include a separate storage device or partition separate from general storage of terminal 202. In some examples, access to terminal cache 216 or content stored therein is restricted to authorized applications such as client application 220.

The CRM 212 can also include processor-executable instructions of a caching module 218 and a client application 220. The caching module 218 can receive cache-update instructions 132 and, in response, update the terminal cache 216. The client application 220, e.g., a smartphone or STB app, can use content stored in terminal cache 216. For example, the client application 220 can receive, or present to a user, content 120 such as video, audio, or other media. Additionally or alternatively, the client application 220 can include an update program configured to apply firmware or other updates described herein based on update content 120 stored in terminal cache 216. In some examples, the terminal 202 can, under control of the client application 220, transmit to the server 204 the content request 116 or receive from the server the content 120.

The terminal 202 can further include a user interface (UI) 222, e.g., including a display 224, e.g., an electronic display device, a speaker, a vibration unit, a touchscreen, or other devices for presenting information to a user and receiving commands from the user. The UI 222 or components thereof, e.g., the display 224, can be separate from the terminal 202 or integrated with the terminal 202. The terminal 202 can further include one or more radio(s) 226 configured to selectively communicate wirelessly via the network 206, e.g., via an access network 106 or 108, or one or more transceivers (not shown) configured to selectively communicate using wired connections via the network 206. Radio(s) 226 can include, e.g., radios for any of the wireless or cellular protocols listed herein, or future packet- or cell-based evolutions thereof. Radios 226 can be examples of network interfaces. In some examples, a communications interface of terminal 202 can include at least one of a network interface (e.g., radio(s) 226), a memory interface (e.g., for communication between processor(s) 214 and CRM 212), or a bus interface (e.g., a local bus interface or pluggable-bus interface, such as Peripheral Component Interconnect, PCI, PCI Express, PCIe, or Serial Advanced Technology Attachment, SATA).

The server 204 can include one or more network interface(s) 228 configured to communicate via network 206. Server 204 can include one or more processor(s) 230 communicatively connected with one or more computer readable media (CRM) 232. Processor(s) 230 can be of any of the types described herein with reference to processor(s) 214. CRM 232 can be of any of the types described herein with reference to CRM 212. In some examples, a communications interface of server 204 can include at least one of a network interface 228, a memory interface to CRM 232, or a bus interface.

The CRM 232 can be used to store processor-executable instructions to perform predictive processing 130. For example, CRM 232 can store executable instructions of a training module 234 or an instruction module 236. The processor-executable instructions can be executed by the processors 230 to perform various functions described herein. In some examples, server 204 includes either training module 234 or instruction module 236. In other examples, server 204 includes both training module 234 and instruction module 236.

The CRM 232 can be used to store processor-executable instructions to perform caching processing 134. For example, CRM 232 can store executable instructions of a communications module 238. As shown, communications module 238 can transmit or receive media or signaling traffic, in various examples. In some examples, communications module 238 can receive or collect usage data 128. In some examples, as described below, communications module 238 participates in performing predictive processing 130.

In some examples, processor(s) 230 and, if required, CRM 232, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. Similarly, processor(s) 214 and, if required, CRM 212 are referred to as a "control unit."

The cellular network 208 can provide wide-area wireless coverage. Example cellular networks 208 can include second-generation (2G) cellular networks such as the GSM or Code Division Multiple Access (CDMA), or third-generation (3G) cellular networks such as the Universal Mobile Telecommunications System (UMTS). Other example cellular networks 208 can include Enhanced Data GSM Environment (EDGE), GSM EDGE Radio Access Network (GERAN), UMTS Terrestrial Radio Access Network (UTRAN), or fourth-generation (4G) cellular networks, such as LTE carrying VoLTE sessions using SIP signaling. Other example cellular networks 208 can include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Advanced Mobile Phone System (AMPS), High Speed Packet Access (HSPA), evolved HSPA (HSPA+), The data network 210 can include various types of networks for transmitting and receiving data (e.g., packets), including networks using technologies such as IEEE 802.1x protocols, wireless microwave access (WIMAX), WIFI, IEEE 802.15.1 ("BLUETOOTH"), Asynchronous Transfer Mode (ATM), and other network technologies, e.g., configured to transport IP packets, and/or any future IP-based network technology or evolution of an existing IP-based network technology. In some examples, the server 204 includes or is communicatively connected with an interworking function (IWF) or other device bridging networks, e.g., LTE, 3G, or POTS networks. In some examples, the server 204 can bridge SS7 traffic from the PSTN, or WebRTC traffic from the public Internet, into the network 206, e.g., permitting PSTN customers to place calls to cellular customers and vice versa.

In some examples, the cellular network 208 and the data network 210 can carry voice or data. For example, the data network 210 can carry voice traffic using Voice over Internet Protocol (VoIP) or other technologies as well as data traffic, or the cellular network 208 can carry packets using High Speed Packet Access (HSPA), LTE, or other technologies as well as voice traffic. Some cellular networks 208 carry both data and voice in a packet-switched format. For example, many LTE networks carry voice traffic in packets according to the voice-over-LTE (VoLTE) standard. Many data networks 210 can carry over-the-top (OTT) sessions encapsulating, e.g., voice or video data in a way transparent to an underlying packet transport. Various examples herein provide origination and termination of, e.g., carrier-grade voice calls on, e.g., circuit-switched (CS) networks 206 or mixed VoLTE/3G networks 206, and on terminals 202 including original equipment manufacturer (OEM) handsets and non-OEM handsets.

Communications between the server 204 and terminals such as the terminal 202 can additionally or alternatively be performed using other types of networks 206, such as Ethernet, optical links (e.g., Synchronous Optical NETwork, SONET), or other computer networks, or Plain Old Telephone Service (POTS) or PSTN lines, e.g., using Signaling System 7 (SS7) signaling.

Figure 3:
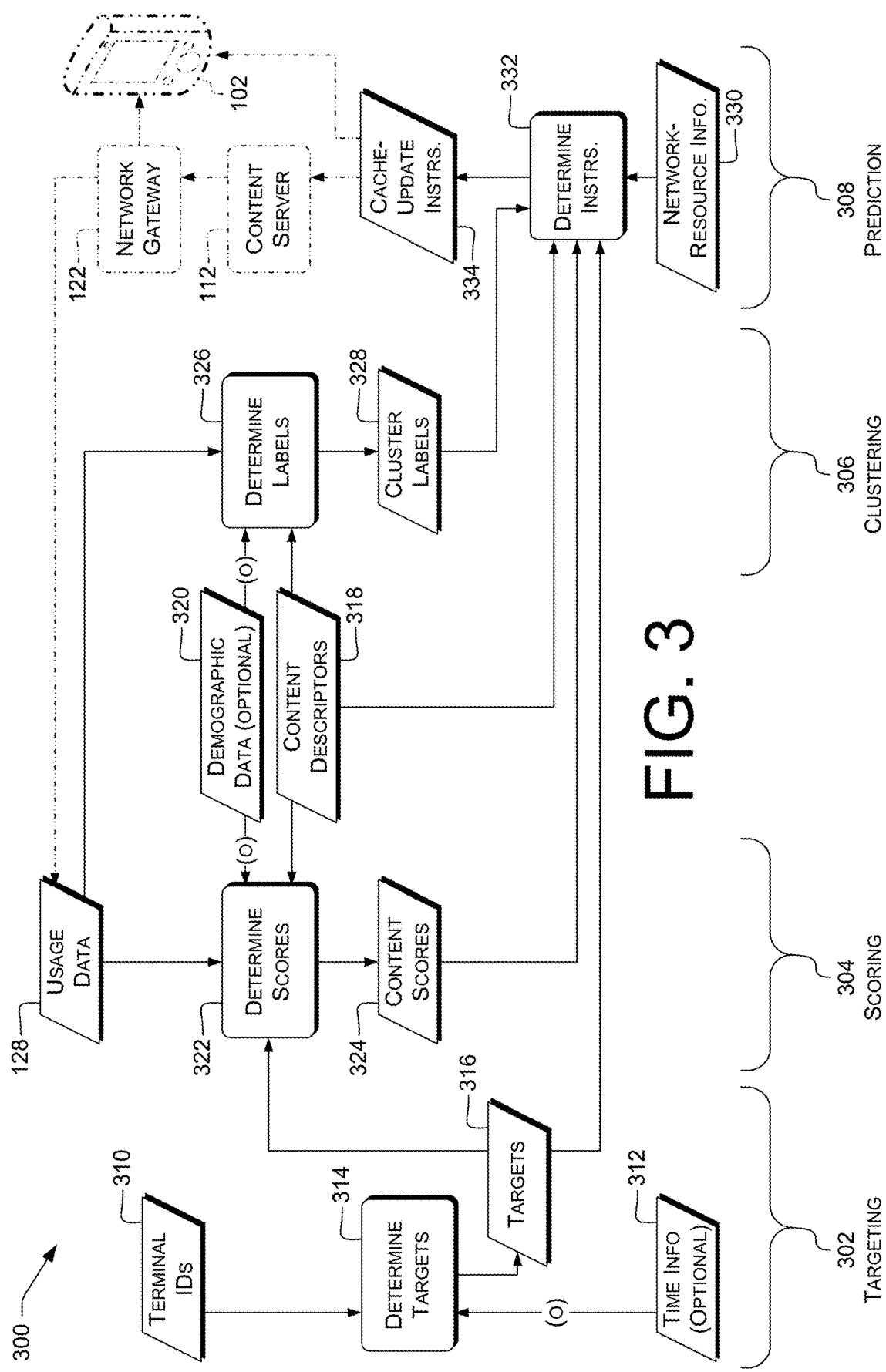
FIG. 3 is a dataflow diagram illustrating techniques for selecting cache-update instructions according to some implementations.

FIG. 3 is a dataflow diagram of an example prediction system 300. Prediction system 300 can be implemented in or by predictive processing 130. Some functions of caching processing 134 are also described herein with reference to FIG. 3. Prediction system 300 determines a prediction of what content is likely to be consumed by terminal(s) 102, so that the predicted content can be loaded into the respective terminal cache(s) 126 ahead of the likely time of content consumption. This can permit the content to be consumed from the terminal cache 126 rather than across the distributor's network, which can reduce network load. Prediction system 300 includes a targeting section 302, a scoring section 304, a clustering section 306, and a prediction section 308. Scoring section 304 and clustering section 306 determine inputs to prediction section 308. Some examples use a first neural network (or other computational model) in scoring section 304, a clustering unit in clustering section 306, and a second neural network (or other computational model) in prediction section 308 to determine which items of content 120 to be loaded into or retained in a particular terminal cache 126 at a particular time or during a particular time period.

Operations shown in FIG. 3 and in FIGS. 4-10, discussed below, can be performed in any order except when otherwise specified, or when data from an earlier step is used in a later step. For clarity of explanation, reference is herein made to various components, operations, and data transmissions shown in FIGS. 1 and 2 that can carry out or participate in the steps of the example method. It should be noted, however, that other components can be used; that is, example dataflow(s) or method(s) shown in FIGS. 3-10 are not limited to being carried out by the identified components, and are not limited to being carried out using the identified operations or data transmissions.

In some examples, prediction system 300 takes as input state information such as any of the current date or time of day, a date, time of day, or time period for which predictions are being made, or a geographic region for which predictions are being made. Additionally or alternatively, state information can include dates or identities of local, regional, or national events recorded in a datastore. Such events can affect users' content demands. Examples of such events can include premiere dates of new episodes or seasons of popular shows, release dates of software packages, scheduled release dates of operating-system or other updates (e.g., Patch Tuesday), or holidays. For clarity of the diagram, the inputs listed in this paragraph are not expressly shown in FIG. 3. Any of the sections 302, 304, 306, 308 can use any of the inputs listed in this paragraph, in various examples.

Targeting section 302 takes as input a designation of population of terminals 102 or users for which predictions are to be made. The population is illustrated as a set of terminal identifiers 310, e.g., IMEIs, MAC addresses, or other identifiers by which individual terminals 102 and their respective terminal caches 126 can be addressed. However, this is not limiting, and other forms of identification or terminal selection can be used. For example, locations indicated in usage data 128 or recorded during operation of terminals or in user records (all used, e.g., with the user's consent, or anonymized) can be used to select specific terminals 102 for inclusion in the target 316 (below).

Targeting section 302 can additionally take as input time information 312 indicating, e.g., time period(s) in which the terminal cache 126 may or should be updated, or time period(s) in which the content 120 is expected to be consumed. The latter are referred to herein for brevity as "presentation" times or time period(s). Presentation times or time period(s), and other times or time period(s) described herein, can include dates, times without dates (e.g., implying a current day or another base day), or timestamps (both date and time). In some examples, e.g., new episodes of television shows, the presentation time period can be a period at or during which the episode is unlocked and becomes available for consumption. Examples of presentation times are described herein, e.g., with reference to operations 914-918.

At operation 314, targeting section 302 determines one or more targets 316 for which respective predictions will be made. For example, operation 314 can determine a respective target 316 for each combination of a terminal 102 and a time period. The time period can be, e.g., a time period in which the terminal cache 126 should be updated, or a time period in which the content 120 is considered by a computational model (CM) to be likely to be consumed, as determined using techniques herein.

In various examples, the targeting section 302 determines at least one target 316 covering more than one terminal 102 or more than one time period. In some examples, a particular target 316 includes all terminal(s) 102 served by a particular distributor; all terminal(s) 102 served by a particular distributor, or by any distributor, in a particular neighborhood, city, census-designated place, or other geographic area; all of the terminal(s) 102 associated with a particular user; or fewer than all of the terminals in any of those terminal(s) 102. In some examples, the targeting section 302 determines a target associated with a presentation time period and a transfer time period at least partly preceding the presentation time period. For example, a target can be associated with a presentation time period of the next episode of a popular evening show, and a transfer time period overnight the night before (e.g., presentation at 8:00 PM on day X and transfer between 1:00 AM and 4:00 AM on day X).

In some examples, a target is associated with a predetermined set of item(s) of content, e.g., multiple items of content or a single item of content 120. Considering the latter case, without loss of generality, in some examples, the cache-update instructions 132 indicate whether to transmit the single item of content 120 to terminal(s) associated with that target, e.g., during a transfer time period associated with that target. The discussion below relating to instructions to add or remove items of content 120 from terminal caches 126 also applies, without loss of generality, to instructions indicating whether or not to add item(s) of content 120 to terminal caches 126 associated with a target.

Throughout the remaining discussion of FIG. 3, and also the discussion of FIGS. 4-10, processing is performed for each target 316 independently, in some examples, unless otherwise specified. For example, each section 304-308 can determine a respective set of computational-model inputs for each target. The predictions for a particular target 316 can then be used to adjust the terminal cache(s) 126 of the terminal(s) 102 in or associated with that target 316. This permits training computational models, and determining predictions, for multiple targets 316 in parallel (in some examples), which can reduce the latency of loading terminal caches 126 and increase the probability that content a user desires to consume on a specific terminal 102 will be present in the respective terminal cache 126 at the desired time of consumption. In some examples, separate computational model(s) are used for respective target(s) 316. In some examples, at least one computational model is used for at least two target(s) 316.

Scoring section 304 takes as inputs usage data 128 associated with a target 316, and content descriptors 318. Each content descriptor 318 identifies an item of content 120 that can be transferred to a terminal cache 126. An item of content 120 can be, e.g., an update to an app, the OS, device firmware, or device configuration; a video or portion thereof; a sound recording or portion thereof; a banner image or text item for presentation to a user; or a block of time-sensitive data (e.g., stock prices or scores of sporting events in progress). In some examples, the content descriptors 318 include metadata regarding the respective items of content 120, e.g., the size of the item of content 120 in bytes, the length of the item in seconds, whether alternative versions (e.g., lower resolutions) of the item are available, or a timestamp before which the item may not be presented to a user (e.g., for new episodes of TV shows that are released at a particular time, such as DOCTOR WHO).

In some examples, usage data 128 can include non-content-specific information such as CPU or network load averages, bandwidth usage, or network-connection count or duration, e.g., at terminal(s) 102 or network gateway 122. Additionally or alternatively, usage data 128 can include content-specific information (e.g., collected with user consent or anonymized) indicating which content has been consumed, when it was consumed (e.g., quantized to a particular time interval, such as an hour, half-hour, or quarter-hour, in some examples), or (with user consent) by whom it was consumed.

In some examples, usage data 128 is associated with a predetermined time period. For example, the predetermined time period can include the time period during which the usage data 128 is collected. Additionally or alternatively, the predetermined time period can be a time period after the time at which the usage data 128 is collected. In some examples, training module 234 or instruction module 236 can smooth collected data, or estimate usage data 128 for a future time period, by extrapolating historical usage data 128, e.g., using linear, logarithmic, or exponential regression, moving averages, weighted averages, or any combination thereof.

In some, but not all, examples, scoring section 304 takes as input demographic data 320 representing user(s) of the terminals 102 for which predictions are to be made. Demographic data can include, e.g., users' ages, income levels, or other demographic information. In some examples, demographic data 320 is not used. In some examples using demographic data 320, at least one of scoring section 304, clustering section 306, or prediction section 308 uses usage data 128 from a first population of terminals 102 as if that usage data had been collected from a second population of terminals 102. The first population of terminals 102 and the second population of terminals 102 are selected based on similarity between those populations as expressed by demographic data 320. For example, usage data 128 for a particular first population of terminals 102 in a city of a particular size can be used for a second population of terminals 102 in a different city of a similar size. In some examples, similarity can be determined by clustering demographic data 320 using any of the techniques described herein with reference to clustering section 306.

At operation 322, scoring section 304 determines respective content scores 324 for the items of content 120 represented by the content descriptors 318. Content scores 324 can represent or be correlated with a likelihood that the user of a particular terminal 102 in the target 316 will consume a particular item of content 120, e.g., at an unspecified time in the future, or during a particular time period associated with the target 316. In some examples, content scores 324 are numeric.

Operation 322 can include applying at least one of the inputs listed above to a trained computational model (CM), e.g., a neural network (NN) comprising at least one layer of artificial neurons. In some examples, the NN is not a recurrent neural network (RNN). The content scores 324 can be outputs of the trained CM, or can be the results of scaling or normalizing (e.g., softmax) the outputs of the trained CM. In some examples, the outputs are numerical, and higher-scoring items of content 120 are preferentially cached compared to lower-scoring items of content 120.

For clarity of explanation, examples of content scores 324 and other CM outputs are discussed herein with reference to scalar, real- or integer-value result values, in which higher (or more positive) result values indicate higher user satisfaction or a more preferable action than do lower (or more negative) result values. However, these examples are not limiting. In other examples, unless expressly indicated, more preferable outcomes can be represented by more negative result values, with suitable changes to equations herein. For example, a CM output value can correspond to a cost or loss.

In various examples, CM output values can be positive or negative. CM output values can be real- or integer-valued. CM output values can be elements of a finite set of discrete numerical values, ordinal values, categorical values, or Boolean values (e.g., success vs. failure). For brevity herein, without loss of generality, CM output values representing more desirable outcomes or superior properties are referred to as "more favorable" and those representing less desirable output or inferior properties are referred to as "less favorable."

Clustering section 306 takes as inputs usage data 128 and content descriptors 318. In some, but not all, examples, clustering section 306 also takes as input demographic data 320.

At operation 326, clustering section 306 determines respective cluster labels 328 for the items of content 120 represented by the content descriptors 318. Operation 326 can include performing a natural-neighbors, naïve Bayes, correlation-matrix-based, or other clustering of the content descriptors 318. In some examples, the number of clusters is predetermined. In other examples, the number of clusters is determined algorithmically during the clustering process. Use of cluster labels 328 can permit the prediction section 308 to determine probability based on categories represented by the cluster labels 328 rather than by the details of individual items of content 120. This can reduce the probability of overfitting and noisy (e.g., less precise) prediction results.

In some examples, the clusters are determined based at least in part on similarity or proximity in at least one of the following: content type, content attribute, content duration (e.g., for media) or byte count (e.g., for non-media), demand, demographic factor(s), or application metadata. Example content types can include TV-show episode, feature film, or short film. Example content attributes can include content rating, suitability for children, name of content, names of producer(s), name of showrunner, names of writer(s), or names of actor(s). For updates or other non-media content, example content types can include firmware update, configuration update, OS update, or app update. Example content attributes can include identifier(s) of the software or firmware to be updated (e.g., "jp.co.Cold-Fusion.CrystalClash.Android" for the CRYSTAL CLASH app on ANDROID), version number(s) of the item to which the update is applicable, version number(s) after the update, or permissions required for the update.

In a nonlimiting example, the items of content 120 are television episodes. Clustering by viewer age bins of 0-9 years, 10-19 years, and 20+ years may result in, e.g., all children's shows sharing a first cluster label 328; all teenagers' shows sharing a second, different cluster label 328; and all grown-ups' shows sharing a third cluster label 328 different from the first cluster label 328 and the second cluster label 328. In another nonlimiting example, clustering is performed by show type, so that, e.g., action shows carry a first cluster label 328 and comedies carry a second, different cluster label 328.

In still another nonlimiting example, clustering is performed based on typical consumption pattern or on proxies for typical consumption pattern. Consumption pattern can be determined with respect to the terminal(s) 102 or time period(s) associated with a particular target 316, or with terminal(s) 102 or time period(s) associated with more than one target 316. In an example of clustering using consumption pattern, clustering can be performed based on the average time between when an episode is released and when it is watched. This may distinguish new episodes of popular shows (typically watched concurrently by large numbers of users), which have a relatively smaller average time, from episodes of older "background" shows that users may play in order while they go about other tasks, which have a relatively larger average time.

Additionally or alternatively, clustering can be performed based on the number of consecutive episodes of a shows that are typically watched without a significant time gap between them, or that are played by automatic "play next" functions. This can also distinguish new shows, which have a relatively lower number of consecutive episodes, from background shows, which have a relatively higher number of consecutive episodes. In yet another nonlimiting example, clustering is performed based on the show of which an episode is part. For example, individual episodes of DUCKTALES and of DONALD DUCK can be given one label, and individual episodes of DARKWING DUCK can be given a different label.

In still a further nonlimiting example, clustering can be performed based on the number of users who consumed a particular item of content 120, or based on the number of terminals 102 at which a particular item of content 120 was consumed. This can permit distinguishing relatively more popular shows from relatively less popular shows using cluster labels 328.

Prediction section 308 takes as inputs content descriptors 318, content scores 324, and cluster labels 328. Prediction section can additionally take as input usage data 128, in some examples. Prediction section 308 also takes as input network-resource information 330. Network-resource information 330 can include information about, e.g., any or all of: the amount of network bandwidth available for transmitting content 120 to terminal cache(s) 126 associated with a particular target 316; network load (near-real-time, or historical averages) of networks to which the terminal(s) 102 of a target 316 are connected (e.g., at a time indicated in the corresponding time information 312 for that target 316); or predicted network quality of service (QoS) during a transfer time period or presentation time period. Predicted QoS or others of these types of network-resource information 330 can also be associated with or conditioned on location(s) of terminal(s) 102, or predicted location(s) of terminal(s) 102 during the presentation time period. Any of those types of network-resource information 330 can be expressed as single values; as a function of, e.g., times of day, week, or month (e.g., implemented using a lookup table or mathematical relationship(s)); or as a function of conditions (e.g., on-peak vs. off-peak). In some, but not all, examples, prediction section 308 also takes as input demographic data 320. For example, as discussed above, usage data 128 from one population can be used with respect to another population that is similar based on demographic data 320.

At operation 332, prediction section 308 determines one or more cache-update instructions 334, which can represent cache-update instructions 132. Each cache-update instruction 334 represents a change to be made to the state of a terminal cache 126, or a state into which terminal cache 126 should be transitioned if the terminal cache 126 is not already in that state. For brevity and without limitation, this document discusses specific examples in which cache-update instructions 334 represent state changes.

In some examples, operation 332 can include applying at least some of the inputs listed above to a trained CM, e.g., a neural network comprising at least one layer of artificial neurons. In some examples, the NN is not an RNN. The outputs of the trained model can include numerical or symbolic indications of the cache-update instructions 334. Additionally or alternatively, the outputs of the trained model can include prediction values indicating, e.g., which items of content 120 should be present in the terminal cache 126, and prediction section 308 can compare that indication to a list of items currently in the terminal cache 126 to determine how the terminal cache 126 should be changed to reflect the outputs of the CM.

In some examples, two targets 316 include a particular terminal 102 at successive time periods. In some of these examples, prediction section 308 can compare the predictions for an earlier-time-period target 316 to the predictions for a later-time-period target, and determine cache-update instructions 334 to implement any differences between the two at the particular terminal 102. This can be done for any number of terminal(s) 102.

Example cache-update instruction 334 can include an instruction to clear a terminal cache 126; an instruction to load particular item(s) of content 120 into a terminal cache 126; or an instruction to remove particular item(s) of content from a terminal cache 126. Cache-update instructions 334 to load or remove item(s) of content 120 can include data identifying those item(s), e.g., GUIDs, UUIDs, URIs, DOIs, or other unique identifier(s) of those item(s). Each cache-update instruction 334 can include data identifying terminal(s) 102 whose respective terminal cache(s) 126 are to be updated.

In a nonlimiting example, the CM used by operation 332 outputs a respective ranking associated with each content descriptor 318. The rankings can indicate that the terminal cache 126 should be loaded with as many items of content 120 as will fit, beginning with the highest-ranked and continuing in descending order or rank. The prediction section can add the sizes indicated in the content descriptors 318, moving in order down the ranks, until insufficient room remains in the terminal cache 126 for an additional item. The items considered then form a first list of items that should be present in the terminal cache 126. The prediction section 308 can then query the terminal 102 for a second list of the content items stored in the terminal cache 126 thereof, or retrieve the second list from a computer-readable medium (e.g., RAM, Flash, or rotational disk). The prediction section 308 can produce instruction(s) to remove from the terminal cache 126 any item on the second list but not the first, or to add to the terminal cache 126 any items on the first list but not the second.

The instructions to add or remove can be determined by, e.g., sorting both the first list and the second list based on a unique key in or associated with each content descriptor 318 (e.g., a cryptographic hash of the content descriptor's contents, or a unique serial number such as an ISBN), then comparing the first list and the second list using a diff algorithm such as Myers diff or patience diff. Additionally or alternatively, the first list and the second list can be compared using set-difference and set-intersection algorithms.

In some examples, prediction section 308 can determine cache-update instructions 334 to cause specific items of content 120 to be loaded into terminal cache(s) 126. The specific items of content 120 can be determined, e.g., based on NIELSEN ratings or other popularity measures, e.g., by selecting the N≥1 most popular TV shows to be cached. Additionally or alternatively, the specific items of content can be determined by originators. Additionally or alternatively, the specific items of content can be collected from users via in-app prompts, a Web interface, or other user interfaces. For example, a user can register a preference for a particular show, and all episodes of that show will be loaded into terminal cache 126 when available (e.g., during a transfer time before the episode is due to air). In some examples, once an item of content 120 has been selected using any of the techniques described herein, prediction section 308 can determine cache-update instructions 334 to cause items of content 120 related to the selected item of content 120 to be loaded into terminal cache(s) 126.

After prediction section 308 determines the cache-update instructions 334, control device 104 or network gateway 122 can provide (e.g., send or transmit) the cache-update instructions 334 or versions thereof to the content server 112 or terminal(s) 102, as shown by the connections in phantom. All connections in phantom are optional; at least one example includes each respective connection, and at least one example excludes all connections shown in phantom in FIG. 3. The content server 112 or terminal(s) 102 can coordinate with the network gateway 122 to update the terminal cache(s) 126 according to the cache-update instructions 334.

In some examples, at operation 332, the prediction section 308 can determine at least one of the cache-update instructions 334 designating a plurality of terminals 102. For example, the prediction section 308 can merge instructions to add the same item of content 120 to multiple terminals 102 if usage data 128 (e.g., location information therein) of those terminals 102 indicates they are more likely than not to be in range of a particular cell tower during a time period designated for content transmission. The item of content 120 referenced in a merged cache-update instruction 334 can be delivered concurrently to at least two of the terminals 102 listed in the merged cache-update instruction 334, e.g., using eMBMS or other wireless-broadcast techniques. This can reduce the network bandwidth used in loading a firmware or app update or a new episode of a popular show, for example, into multiple terminal caches 126. The wireless broadcast can be performed overnight the night before the update will be performed or the episode will be broadcast (e.g., made available for consumption by users), so that concurrent downloading/viewing at the time of update/broadcast by a large number of users will not cause undue network load.

Merging can be done, e.g., by sorting the cache-update instructions 334 by item of content 120; computing pairwise distances between the terminals 102 for which a particular item of content 120 is referenced by respective cache-update instructions 334; and merging any cache-update instructions 334 for which the pairwise distances are below a threshold. Additionally or alternatively, distances from particular base stations to particular terminals 102 can be determined, and cache-update instructions 334 merged for terminals closest to a particular base station. Alternatively, set-covering algorithms can be used to determine which terminals to merge. The locations of base stations can be used to anchor the sets.

In some, but not all, examples, after the terminal cache(s) 126 have been updated, network gateway 122 can continue to collect usage data 128. This usage data 128 can be used to make additional predictions or to refine (e.g., re-train) the computational models used in prediction system 300. Examples of training are described herein with reference to FIG. 4. Usage data 128 can include hit or miss rates of terminal cache(s) 126, in some examples.

In some examples, the CMs used in scoring section 304 or prediction section 308 may include one or more regression models, e.g., polynomial and/or logistic regression models; classifiers such as binary classifiers; decision trees, e.g., boosted decision trees, configured for, e.g., classification or regression; and/or artificial neurons, e.g., interconnected to form a multilayer perceptron or other neural network. A decision tree can include, e.g., parameters defining hierarchical splits of a feature space into a plurality of regions. A decision tree can further include associated classes, values, or regression parameters associated with the regions. A neural network can have none, at least one, or at least two hidden layers. NNs having multiple hidden layers are referred to as deep neural networks (DNNs).

At least one of the CMs can include, e.g., activation weights, functions, and/or thresholds for artificial neurons and/or other computational units of one or more neural networks; coefficients of learned ranking functions, e.g., polynomial functions; and/or parameters of decision trees and/or other classifiers, in some nonlimiting examples. These are referred to individually or collectively as "parameters" herein.

Figure 4:
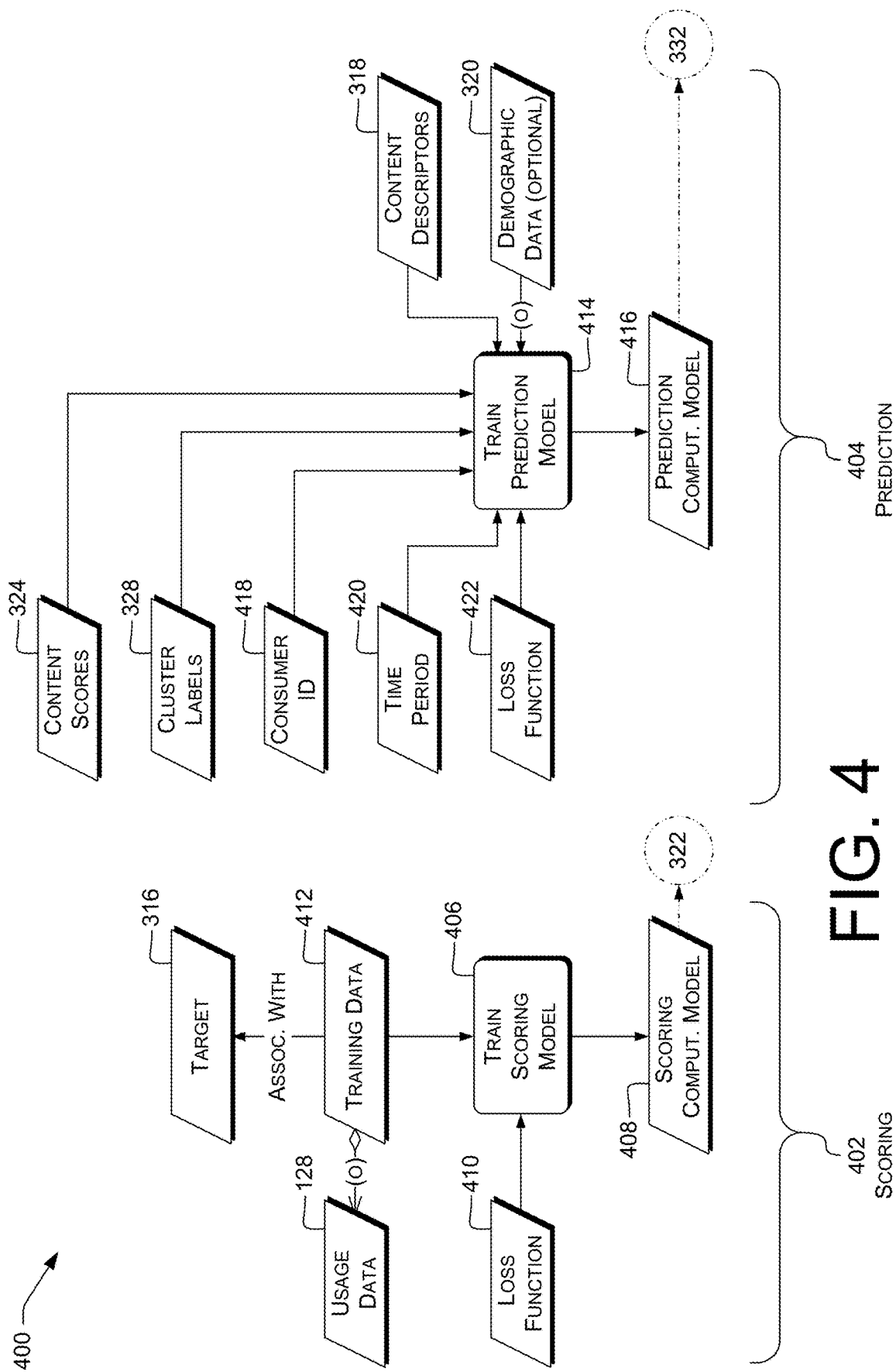
FIG. 4 is a dataflow diagram illustrating techniques for training computational models used in selecting cache-update instructions according to some implementations.

FIG. 4 is a dataflow diagram of an example training system 400 configured to train computational models for prediction systems such as prediction system 300. Training system 400 includes a scoring section 402 and a prediction section 404. In some examples, any input of a computational model illustrated in FIG. 4 can also be used as an input to a corresponding operation depicted in FIG. 3.

System 400 can be configured to determine CMs for use in prediction system 300, e.g., to apply NN-training techniques to determine neuron parameters of artificial neurons in the CMs. For example, system 400 can determine CMs using backpropagation, or using a reinforcement-learning update rule. Error can be determined during training using a loss function in which higher values represent a poorer fit between CM outputs and training-data output values. Example loss functions can include mean squared error, L2 loss, Kullback-Leibler divergence, negative log likelihood, or negative dot product between a normalized NN output vector and the corresponding normalized training-data output vector. Additionally or alternatively, error can be determined using goodness-of-fit functions for which lower values represent a poorer fit. Any examples described herein with reference to loss functions can be adapted (e.g., by changing signs of appropriate quantities) to goodness-of-fit functions.

System 400 can parallelize the training of the NNs and/or other determination algorithms for CMs across multiple processing units, e.g., cores of a multi-core processor and/or multiple general-purpose graphics processing units (GPGPUs). For example, multiple layers of DNNs may be processed in parallel on the multiple processing units. System 400 can train neural networks such as DNNs minibatch-based stochastic gradient descent (SGD). SGD can be parallelized along, e.g., model parameters, layers, and data (and combinations thereof). Other frameworks besides SGD can be used, e.g., minibatch non-stochastic gradient descent and/or other mathematical-optimization techniques.

In some examples, system 400 can determine and/or adjust CM parameters using the Theano and/or scikit-learn packages for PYTHON, and/or another symbolic/numerical equation solver, e.g., implemented in C++, C #, MATLAB, Octave, and/or MATHEMATICA. In some examples, Theano can be used to perform NN training, e.g., using the "grade( )" and "function( )" routines.

In some examples, a learning-step function can be given as input a randomly-selected minibatch of the training data at each call in order to determine and/or adjust the model according to stochastic gradient descent (SGD) techniques. In some examples, computational models can be determined or adjusted using SGD with momentum. Grid search can be used to select the learning rate for, e.g., NN training and/or other CM determination and/or adjustment.

In some examples, CM(s) can be determined with respect to specific target(s) 316. In some examples, at least one CM can be determine based at least in part on data from more than one target 316, e.g., from more than one group of terminals or more than one time period.

Scoring section 402 includes operation 406 of training a scoring computational model 408, e.g., a neural network. Scoring CM 408 can then be used by operation 322 in determining content scores 324. In some examples, scoring CM 408 includes a neural network having one layer, a neural network having more than one layer (e.g., one input layer, one hidden layer, and one output layer), or a DNN. In some examples, operation 406 includes using Adaboost training in a supervised learning process to determine parameters for the scoring CM 408. Additionally or alternatively, operation 406 can include using other training or CM-determination operations described above.

In some examples, operation 406 uses a loss function 410 configured to drive training so that items of content 120 will receive, from trained scoring CM 408 via operation 322, higher (more favorable) content scores 324 if they are larger than if they are smaller, if they have many concurrent or near-concurrent viewers than if they have fewer, if they have more total viewers than if they have fewer, if they are associated with items a particular user has already watched than if not, if they are watched by more people sharing demographic characteristics with a user than if not, if time or probability of consumption are more predictable than if less predictable, or any combination of one or more of any of those.

In some examples, the loss function 410 is configured to drive training so that items of content consumed infrequently, or on an irregular schedule, have relatively lower scores, and items of content consumed more frequently, or on a more regular schedule, have relatively higher scores. This can increase the likelihood that an item of content selected for inclusion in a terminal cache 126 will be consumed, which can increase the hit rate of terminal cache 126.

In some examples, operation 406 takes as input scoring-training data 412 for a target 316 associated with a particular CM being trained. For example, the scoring-training data 412 can include usage data 128 indicating which items of content 120 were consumed by terminal(s) 102 in the target 316, optionally during time period(s) associated with the target 316. In some examples, scoring-training data 412 can include at least some demographic data 320. Operation 406 can train scoring CM 408 to score highly the items of content 120 indicated in the scoring-training data 412 as having been consumed, the trained score being a function of the corresponding input values included in the scoring-training data 412. The structure of the scoring CM 408 and the input values to scoring CM 408 can be any of the options described herein with reference to FIG. 3 or 4 (e.g., with reference to operation 322), in some examples.

In some examples, the scoring CM 408 for a target 316 including users who consistently consume a particular show may be trained to produce a relatively higher score 324 for that show than for at least one other show. Additionally or alternatively, the scoring CM 408 for a target 316 may be trained to produce a higher score 324 for items of content 120 that are consumed by a higher percentage of the users or terminals 102 in the target 316 than for items of content 120 that are consumed by a lower percentage of the users or terminals 102 in the target 316.

In some examples, operation 406 determines an average or other representation of the scoring-training data 412 for a particular set of inputs, and trains the scoring CM 408 based on that average. For example, operation 406 can include dividing the day into half-hour timeslots, determining the most-consumed item of content 120 in each timeslot based on usage data 128, and training the scoring CM 408 to produce a relatively higher score in each timeslot for that most-consumed item of content 120 than for any other item of content.

Prediction section 404 includes operation 414 of training a prediction computational model 416. Prediction CM 416 can then be used by operation 332 in determining cache-update instructions 334. In some examples, prediction CM 416 includes a neural network having one layer, a neural network having more than one layer (e.g., one input layer, one hidden layer, and one output layer), or a DNN. In some examples, operation 414 includes using Adaboost training in a supervised learning process to determine parameters for the prediction CM 416. Additionally or alternatively, operation 414 can include using other training or CM-determination operations described above.

In some examples, operation 414 takes as input at least one content descriptor 318. In some examples, operation 414 takes as input demographic data 320. In some examples, operation 414 does not take as input demographic data 320.

In some examples, operation 414 takes as input the content scores 324. For example, loss function 422 can drive training so that items of content 120 will be more likely to be selected or highly ranked by trained prediction CM 416 if they have relatively higher content scores 324 than if they have relatively lower content scores 324. This reduces the probability of selecting infrequently-consumed content 120 for inclusion in a terminal cache 126, and can thereby increase the hit rate of terminal cache 126.

In some examples, operation 414 takes as input cluster labels 328. As discussed above, this can permit training the prediction CM 416 based at least in part on the labels to reduce overfitting that might be introduced if training without the cluster labels 328. In some examples, operation 414 (and operation of the prediction CM 416 as part of operation 332) does not take as inputs the features input to operation 316.

In some examples, operation 414 takes as input an identifier 418 of a consumer of content. Consumer identifier 418 can identify one or more target(s) 316; one or more terminal(s) 102 in one or more target(s) 316; or at least one terminal 102 and at least one target 316. This can permit training prediction CM 416 to accommodate variation in content-consumption habits between different users. Training based on an identifier 418 of one or more target(s) 316 can permit improving prediction accuracy for a population of users without needing to predict at a per-user level.

In some examples, operation 414 does not take an identifier 418 as input. For example, some embodiments use one prediction CM 416 per target 316. In some of those embodiments, operation 332 can select the appropriate prediction CM 416 for a target 316 under consideration, and that prediction CM 416 can operate without specific input identifying the target 316 or terminal(s) 102 therein. Accordingly, in some examples, operation 414 trains prediction CM 416 using data associated with exactly one target 316.

In some examples, operation 414 takes as input a time period 420 (e.g., information describing time period 420). The time period 420 can be, e.g., a time of content delivery to terminal cache(s) 126 or a time of content consumption. Time period 420 can be a moment in time, e.g., as a zero-length or shortest-representable interval beginning, ending, or both, at the scheduled broadcast time of a content item (e.g., a new episode of DENNIS THE MENACE). Additionally or alternatively, time period 420 can be a closed interval having a beginning point and a different, later end point. For example, the time period 420 can represent a time during which network load is below a predetermined threshold with a predetermined level of confidence, e.g., <15% load (with 95% confidence) between 2 AM and 4 AM. Such a time, or another off-peak time, can be an effective time to load terminal caches 126 so that concurrent content consumption at a later time (e.g., an on-peak time) will not overload the distributor's network.

In some examples, operation 414 uses a loss function 422 configured to drive training so that items of content 120 will receive, from trained prediction CM 416 via operation 332, a higher ranking if they are more likely to be consumed by a consumer identified by a particular consumer ID 418 than if they are less likely to be consumed, if they are likely to be consumed at more terminals 102 associated with the consumer ID 418 than at fewer, if they are more likely to be consumed within a particular time period 420 than if less likely, if they are of a size that can be delivered within the time period 420 than if they are larger than that size, or any combination of one or more of any of those.

In some examples, the loss function 422 is configured to additionally or alternatively drive training so that items of content 120 will receive, from trained prediction CM 416 via operation 332, a higher ranking if the time required to transfer the item of content 120 over the network is longer than the duration of the item of content 120. This can increase the rank of items that cannot be streamed in real time or near real time, e.g., because they have too high a resolution or are in demand by too many terminals 102 concurrently for the network to be able to provide those items on demand. Loading these items of content 120 into terminal caches 126 before the time of content consumption can permit users to consume this content without buffering delays or resolution downgrades, in some examples.

In some examples, separating scoring from prediction (e.g., separating sections 304 and 308, operations 322 and 332, operations 406 and 414, and CMs 408 and 416) permits improving the effectiveness of caching. Scoring (#304, 322, 406, 408) can determine items of content 120 that are likely to be relevant or otherwise of interest to a user of a terminal 102, or that are likely to be consumed at that terminal 102. Prediction (#308, 332, 414, and 416) can determine which of those items are likely to be consumed at a particular terminal 102 in a particular time period, or otherwise which of those items can most productively be cached. This can permit more effectively caching content to handle multiple use cases, e.g., the case of concurrent consumption by multiple users or the case of consumption by a single user unscheduled, in small blocks of time the user may happen to have available.

Figure 5:
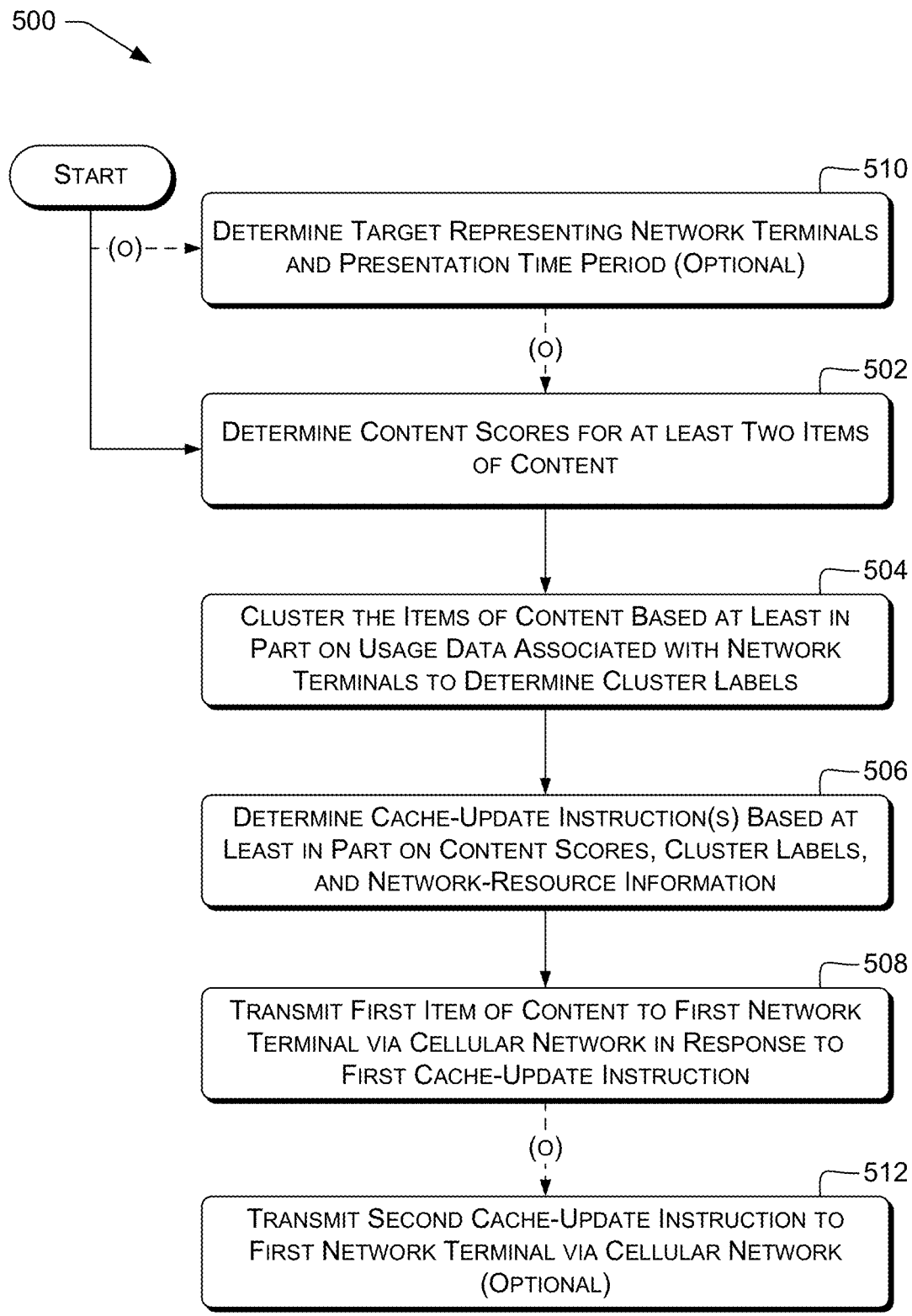
FIG. 5 illustrates example processes for loading content into terminal caches.

FIG. 5 illustrates example processes 500 for caching content 120 at a terminal 102. In some examples, the control device 104 includes control unit(s) configured to, e.g., in response to computer program instructions of the instruction module 236 (e.g., operations 502-506 and 510) or the communications module 238 (e.g., operation 508), perform operations of processes 500. In some examples, operation 504 can be performed at least partly before or at least partly concurrently with operation 502 instead of or in addition to (as shown) after operation 502. In some examples, operations 508 and 512 can be performed in either order or at least partly concurrently.

At 502, the control unit can determine respective content scores 324 for at least two items of content 120. Examples are discussed herein, e.g., with reference to scoring section 304 or operation 322.

At 504, the control unit can cluster the at least two items of content 120 based at least in part on usage data 128 associated with one or more network terminals 102 to determine respective cluster labels 328 for the at least two items of content 120. Examples are discussed herein, e.g., with reference to clustering section 306 or operation 326.

At 506, the control unit can determine one or more cache-update instructions 132 based at least in part on the content scores 324, the cluster labels 328, and network-resource information. In some examples, the one or more cache-update instructions 132 comprise a first cache-update instruction 132 to transmit a first item of content 120 of the at least two items of content 120 to a first network terminal 102. The first network terminal 102 can be a terminal from which at least some usage data 128 was collected. Alternatively, first network terminal 102 can be a terminal 102 from which no usage data 128 was collected. This can permit generalizing the results from some terminals 102 to other terminals 102, e.g., terminals in similar geographical or demographic areas. Generalizing can reduce the amount of storage space required to collect usage data 128, and the amount of network bandwidth used to transmit usage data 128 from the terminals 102 or other network device(s) at which the usage data 128 was collected.

In some examples, the first item of content 120 can be or include at least one of the following: a video recording (e.g., digitized as a file), an audio recording, a firmware update associated with the first network terminal, a configuration-parameters update associated with the first network terminal, an operating-system update associated with the first network terminal, or an app update associated with software installed on the first network terminal. The first item of content 120 can include one or more digital files. For example, an audio recording can be stored and transferred as a single OGG file. A MICROSOFT WORD document can be stored and transferred as a single ZIP archive including multiple files. An update can be stored and transferred as a single-file updater (e.g., an MSI file), an updater executable and separate data files, or an archive including any of those.

At 508, the control unit can transmit, to the first network terminal 102 via a cellular network 208 in response to the first cache-update instruction 132, the first item of content 120, or at least a portion thereof. For example, the control unit can push the first item of content 120 to the terminal, e.g., using a defined protocol common to both the terminal 102 and the control device 104. Additionally or alternatively, operation 508 can include loading the first item of content 120 or an indication thereof (e.g., a URL thereof), into a staging memory (e.g., of control device 104 or network gateway 122). The terminal 102 can periodically query the staging memory via the network 206. The terminal 102 can receive the first item of content 120 directly from the staging memory if it is present. Additionally or alternatively, in response to retrieving an indication from the staging memory, the terminal 102 can retrieve the first item of content from a network location indicated by the indication via the cellular network 208.

In some examples, content 120 is time-shifted, e.g., transfer begins at least ten minutes before the presentation time (or other times, e.g., >30 m, >1 h, >1 day, or during the night immediately preceding the day in which the presentation time occurs). In some of these examples, the first item of content is associated with a presentation time period, as discussed above. The first cache-update instruction is associated with a transfer time period. The transfer time period at least partly precedes the presentation time period. In some of these examples, operation 508 includes transmitting the first item of content 120 to the first network terminal 102 via the cellular network 208 at least partly during the transfer time period.

In some examples, the transfer time period and the presentation time period overlap. For example, transfer of the first item of content 120 can begin before the presentation time period and later overlap with the presentation time period, provided the content to be presented at any given moment has been transferred before that moment. In some examples, the transfer time period and the presentation time period end substantially concurrently, and the transfer time period is longer than the presentation time period.

At 510, the control unit can determine a target representing a plurality of network terminals 102 and a presentation time period, the plurality of network terminals 102 comprising the one or more network terminals 102. The first item of content 120 can be associated with the presentation time period. Examples are discussed herein, e.g., with reference to targeting section 302. In some examples using a target, operation 502 can include determining the respective content scores based at least in part on the usage data 128, the usage data having been collected from, or being otherwise associated with, terminal(s) 102 in the target.

In some examples using a target, operation 506 can include associating each of the one or more cache-update instructions 132 with at least one network terminal 102 of the plurality of network terminals 102 in the target. For example, a particular cache-update instruction 132 can be determined that applies to multiple terminal(s) 102 in the target. Additionally or alternatively, individual cache-update instruction(s) 132 can be determined for each terminal 102 or predefined group of terminals 102 in the target.

In some examples, the one or more cache-update instructions 132 further comprise a second cache-update instruction 132. The second cache-update instruction 132 can be or include, e.g., an instruction to remove a second item of content 120 of the at least two items of content 120 from the first network terminal 102, or an instruction to clear a cache of content items (e.g., terminal cache 216) at the first network terminal 102. Examples are discussed herein, e.g., with reference to operation 332.

At 512, the control unit can transmit the second cache-update instruction 132 to the first network terminal 102 via the cellular network. Examples are discussed herein, e.g., with reference to operation 332.

Figure 6:
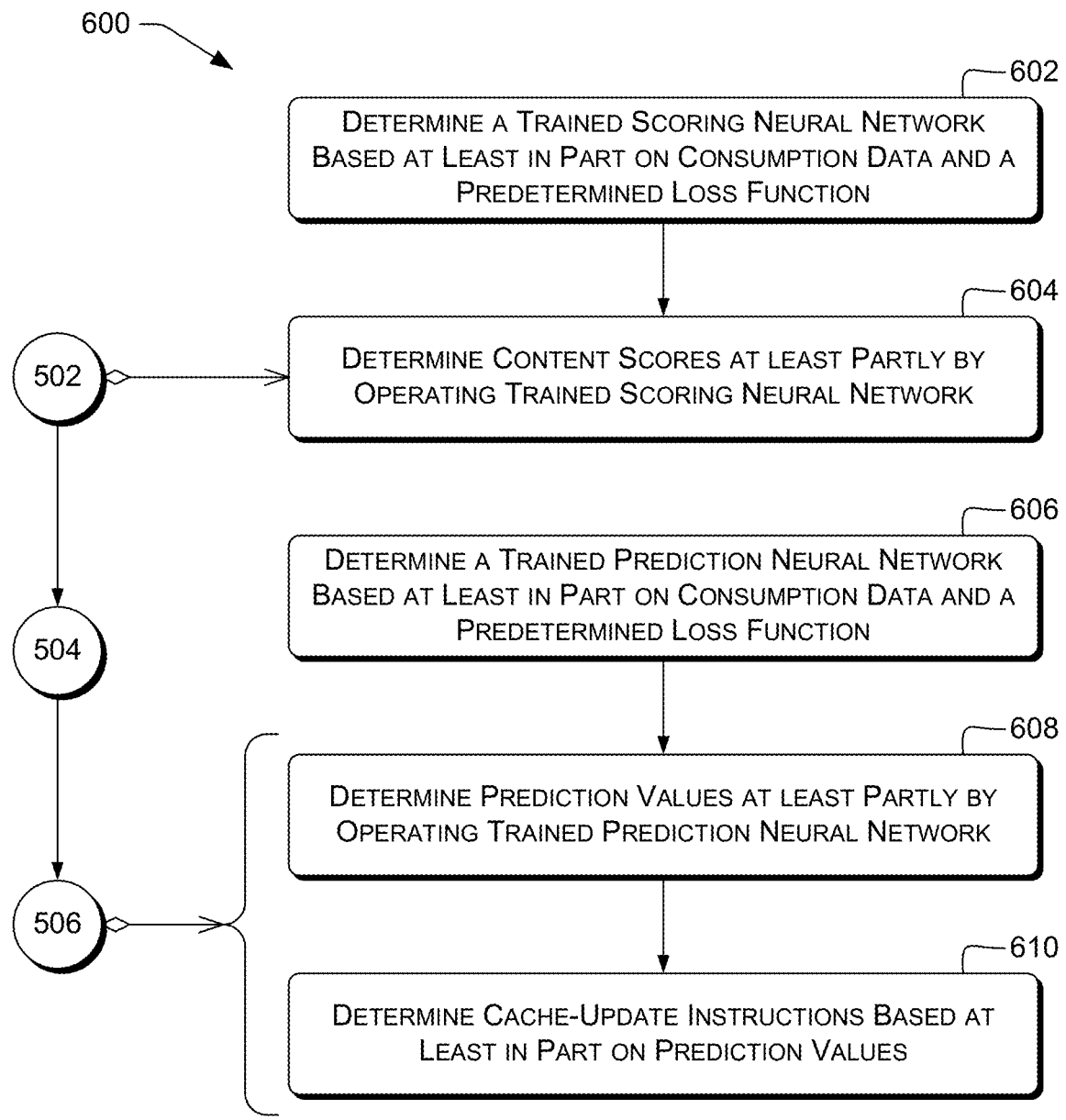
FIG. 6 illustrates example processes for training and operating computational models to determine content scores or cache-update instructions.

FIG. 6 illustrates example processes 600 for caching content 120 at a terminal 102. In some examples, the control device 104 includes control unit(s) configured to perform operations of processes 600, e.g., in response to computer program instructions of the training module 234 (e.g., operations 602 and 606) or the instruction module 236 (e.g., operations 604, 608, and 610). In some examples, operation 502 can include operation 604, or operation 506 can include operations 608 and 610. Operation 602 can be followed by operation 604, or operation 606 can be followed by operation 608.

At 602, the control unit can determine a trained scoring neural network, which can represent scoring computational model 408. The trained scoring NN can be configured to (e.g., trained to) output the respective content scores. For example, the scoring NN can be trained based at least in part on: scoring-training data 412 indicating consumption of content 120 items by network terminals 102, and a predetermined loss function 410. As discussed above with reference to FIG. 4, the loss function 410 can be configured to drive training so that the trained scoring neural network outputs more favorable content scores for items of content that are consumed more consistently at network terminals of the plurality of network terminals (e.g., during the presentation time period) than for items of content that are consumed less consistently at network terminals of the plurality of network terminals. Examples are discussed herein, e.g., with reference to FIG. 4.

At 604, the control unit can determine the respective content scores at least partly by operating the trained scoring neural network. Examples are discussed herein, e.g., with reference to operation 322.

At 606, the control unit can determine a trained prediction neural network, which can represent prediction CM 416, configured to output prediction values. Examples are discussed herein, e.g., with reference to operation 414. The prediction neural network can be determined based at least in part on: identification information of network terminal(s) 102 for which prediction values are to be determined (e.g., a terminal 102 identifier or target identifier), a predetermined loss function 422, and a time period. The time period can be the presentation time period; or a transfer time period that at least partly precedes the presentation time period. The loss function 422 can be configured to drive training so that the trained scoring neural network outputs more favorable prediction values for items of content that are more likely to be consumed at network terminals of the plurality of network terminals during the presentation time period than for items of content that are less likely to be consumed at network terminals of the plurality of network terminals during the presentation time period. Examples are discussed herein, e.g., with reference to FIG. 4.

At 608, the control unit can determine the prediction values at least partly by operating the trained prediction neural network. Examples are discussed herein, e.g., with reference to operation 332 and CM 416.

At 610, the control unit can determine the one or more cache-update instructions based at least in part on the prediction values. Examples are discussed herein, e.g., with reference to operation 332.

Figure 7:
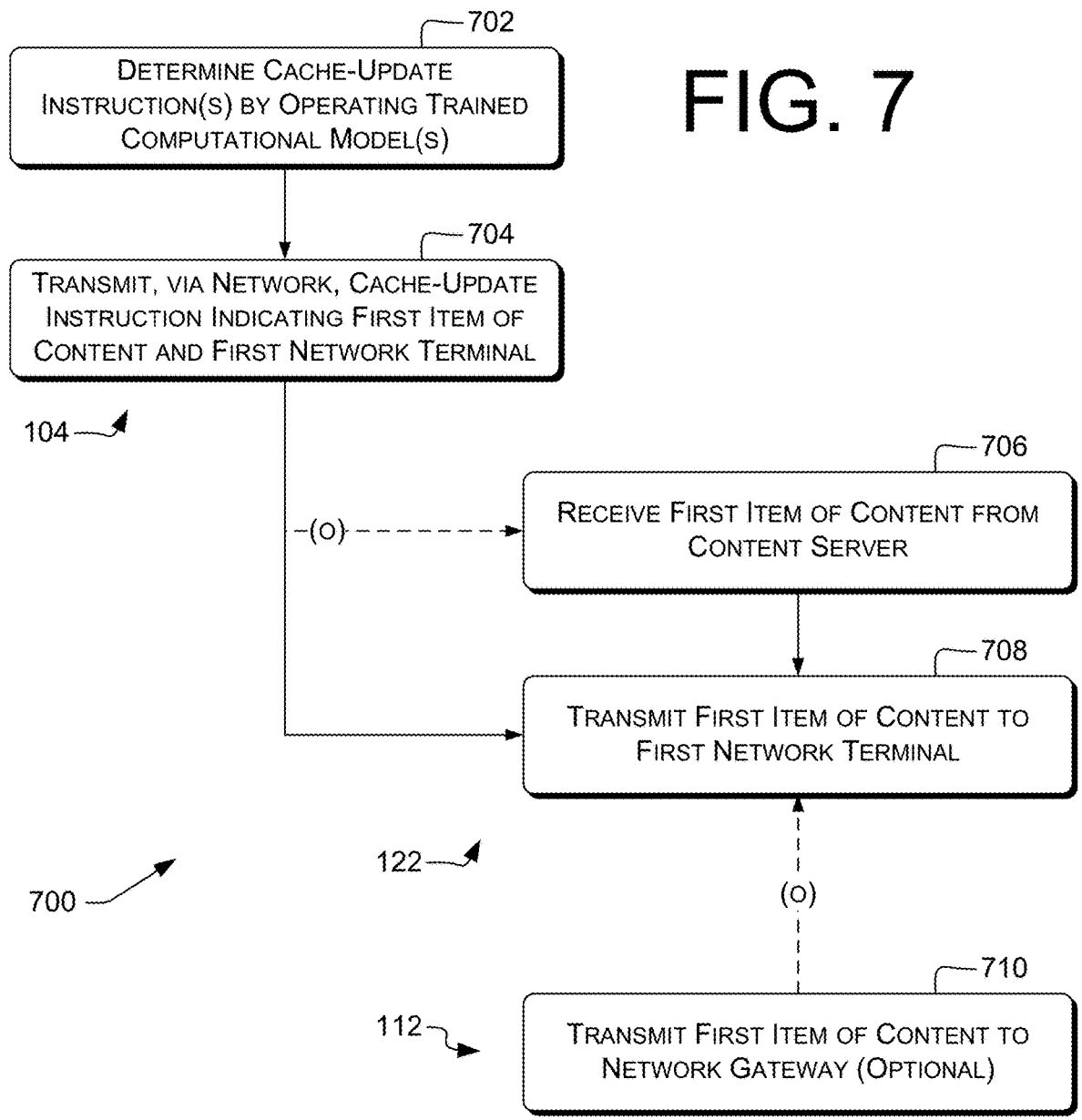
FIG. 7 illustrates example processes for loading content into terminal caches, e.g., by a control device and a network gateway.

FIG. 7 illustrates example processes 700 for caching content 120 at a terminal 102. In some examples, the control device 104 includes control unit(s) configured to perform operations of processes 700, e.g., in response to computer program instructions of the instruction module 236 (e.g., operation 702) or the communications module 238 (e.g., operation 704). In some examples, the network gateway 122 includes control unit(s) configured to perform operations of processes 700, e.g., in response to computer program instructions of the communications module 238 (e.g., operations 706 or 708). In some examples, the content server includes control unit(s) configured to perform operations of processes 700, e.g., in response to computer program instructions of the communications module 238 (e.g., operation 710).

At 702, the control unit of the control device 104 can determine one or more cache-update instructions at least partly by operating one or more trained computational models. Examples are discussed herein, e.g., with reference to FIG. 3, 5, or 6. The one or more cache-update instructions 132 can include a first cache-update instruction 132, which can indicate a first item of content 120 of at least two items of content and a first network terminal 102.

At 704, the control unit of the control device 104 can transmit the first cache-update instruction via a network. Examples are discussed herein, e.g., with reference to FIG. 3 (see, e.g., text following the discussion of operation 332).

At 706, the control unit of the network gateway 122 can receive the first item of content 120 from content server 112. Examples are discussed herein, e.g., with reference to FIG. 1. For example, the network gateway 122 can retrieve the first item of content 120 from content server 112. Additionally or alternatively, the network gateway 122 can receive packets of the first item of content 120 from content server 112 enroute to (e.g., for forwarding by network gateway 122 to) first network terminal 102.

At 708, the control unit of the network gateway 122 can transmit the first item of content 120 to the first network terminal 102. This can be done after the control device transmits the first cache-update instruction 132, in some examples. For example, the network gateway 122 can forward the first item of content 120 to first network terminal 102, or can route packets of the first item of content 120 to the first network terminal 102. Examples are discussed herein, e.g., with reference to operation 508.

In some examples, the first item of content 120 is associated with a presentation time period and the first cache-update instruction 132 is associated with a transfer time period that at least partly precedes the presentation time period. In some of these examples, operation 708 includes transmitting the first item of content 120 to the first network terminal 102 at least partly during the transfer time period. Examples are discussed herein, e.g., with reference to targeting section 302 and operation 508.

In some examples, a networking system includes the content server 112. The content server 112 can push content to the first network terminal 102, in some examples. In some of these examples, operation 704 includes transmitting the first cache-update instruction 132 to the content server 112.

At 710, the control unit of the content server 112 can transmit the first item of content 120 to the network gateway 122. The content server 112 can send the first item of content 120 in a transmission associated with the first network terminal 102. For example, the content server 112 can send packets with a layer-3 address of the first network terminal 102 and a layer-2 address of the network gateway 122, or otherwise send packets to be routed through the network gateway 122 to the first network terminal 102. Additionally or alternatively, the content server 112 can transmit the first item of content 120 in response to a request from the network gateway 122. Examples are discussed herein, e.g., with reference to operation 508.

In some examples, the network gateway 122 can pull content from the content server 112 and push the content to the first network terminal 102. In some of these examples, operation 704 includes transmitting the first cache-update instruction to the network gateway 122.

In some of these examples, at operation 706, the control unit of the network gateway 122 can retrieve the first item of content 120 from a content server 112. This can be done in response to the first cache-update instruction 132, or can be done before then, e.g., in examples in which the network gateway 122 has its own cache. For example, the network gateway 122 can pre-load popular content from content server 112.

In some of these examples, at operation 708, in response to the first cache-update instruction 132, the network gateway 122 can transmit the first item of content 120 (e.g., from a cache of network gateway 122) to the first network terminal 102.

Figure 8:
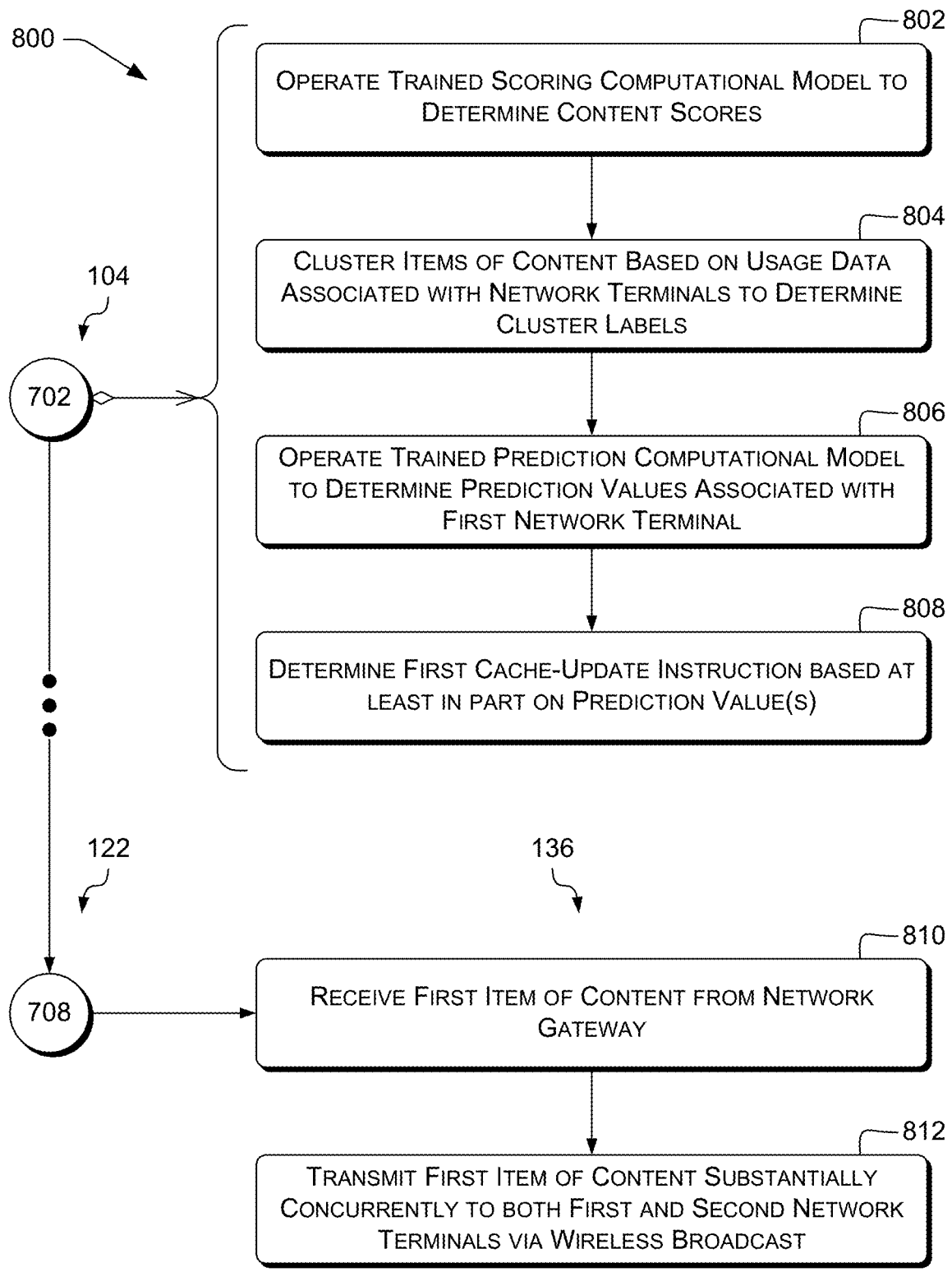
FIG. 8 illustrates example processes for determining cache-update instructions and transferring content, e.g., in response to the cache-update instructions.
Figure 9:
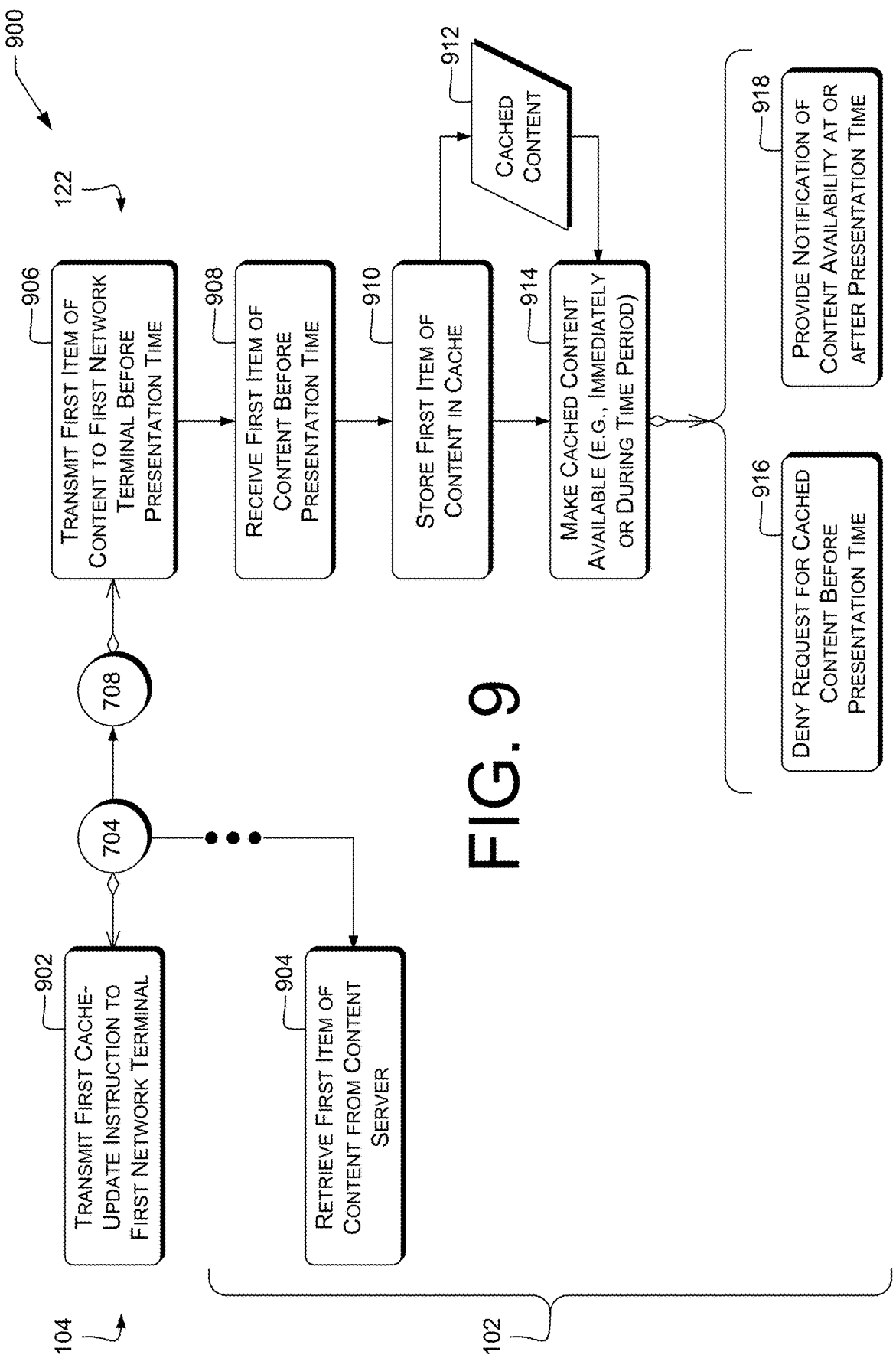
FIG. 9 illustrates example processes for loading content into terminal caches and presenting content from terminal caches.

In some examples, updates (e.g., firmware over the air, FOTA) (or other content 120, and likewise throughout the remainder of the discussion of FIG. 7) can be distributed to terminals 102 in various ways. In a push model, updates are transmitted to a terminal 102, e.g., during maintenance windows or other predetermined time periods. In a pull model, a terminal 102 requests updates, e.g., in response to a user command. In a poll model, a terminal 102 requests updates on a predetermined schedule, e.g., at substantially fixed time intervals. FIGS. 8 and 9, below, discuss techniques that can be used to implement some of these models. In some examples, updates can be transmitted to terminal(s) 102 using wireless broadcast, during off-peak or other relatively lighter-network-load transfer time windows, or both. In some examples of pull models, the user command can trigger installation of updates already stored in terminal cache 126, which can speed the installation process and improve user experience. Various examples can reduce the peak-tariff data usage of updates, shorten the amount of time required to distribute updates across a population of terminals 102, permit transferring updates over WIFI or other non-cellular connections for installation when only in cellular range or when out of range of wireless connectivity, or increase the success rate of updates by preventing network behavior from interfering with an update (e.g., updating from terminal cache 126 may not require any network interaction).

FIG. 8 illustrates example processes 800 for caching content 120 at a terminal 102. In some examples, the control device 104 includes control unit(s) configured to perform operations of processes 800, e.g., in response to computer program instructions of the instruction module 236 (e.g., operations 802-808). In some examples, the WBS 136 includes control unit(s) configured to perform operations of processes 800, e.g., in response to computer program instructions of the communications module 238 (e.g., operations 810-812). In some examples, operation 702 includes operations 802-808. In some examples, operation 708 is followed by operations 810 and 812.

At 802, the control unit can operate a trained scoring computational model 408 of the one or more computational models to determine a plurality of content scores 324, each content score 324 associated with a respective item of the at least two items of content 120. Examples are discussed herein, e.g., with reference to operations 322, 406, or 502.

At 804, the control unit can cluster the at least two items of content 120 based at least in part on usage data 128 associated with one or more network terminals 102 to determine respective cluster labels 328 for the at least two items of content 120. Examples are discussed herein, e.g., with reference to operations 326 or 504.

At 806, the control unit can operate a trained prediction computational model 416 of the one or more computational models to determine prediction values associated with the first network terminal 102 based at least in part on the content scores 324, the cluster labels 328, and network-resource information. Examples are discussed herein, e.g., with reference to operations 332, 414, or 506.

At 808, the control unit can determine the first cache-update instruction 132 based at least in part on at least one of the prediction values. Examples are discussed herein, e.g., with reference to operations 332 or 506.

In some examples, the first cache-update instruction 132 further indicates a second network terminal 102. Wireless broadcast (e.g., MBMS or eMBMS) can be used to transmit the first item of content 120 to both the first network terminal 102 and the second network terminal 102 with reduced bandwidth usage compared to two unicast transmissions. Wireless broadcast can be used, e.g., for updates, media, or other content.

At 810, in some of these examples, the control unit of the WBS 136 can receive the first item of content 120 from the network gateway 122. In an LTE example, a PGW, which can represent network gateway 122, can transmit data of the first item of content 120 via an S5/S8 bearer (e.g., a GTP-U tunnel) to a serving gateway (SGW), which can forward the data to an eNodeB, which can represent WBS 136, via an S1 bearer. WBS 136 can receive the first item of content 120 from the network gateway 122 via the S1 bearer.

At 812, the control unit of the WBS 136 can transmit the first item of content 120 substantially concurrently to both the first network terminal 102 and the second network terminal 102 via a wireless broadcast. For example, the WBS 136 can schedule an MBMS or eMBMS transmission, broadcast the first item of content 120 via terrestrial or satellite broadcast, or broadcast using other wireless techniques.

FIG. 9 illustrates example processes 900 for caching content 120 at a terminal 102, and related data items. In some examples, the control device 104 includes control unit(s) configured to perform operations of process 900, e.g., in response to computer program instructions of the communications module 238 (e.g., operation 902). In some examples, the network gateway 122 includes control unit(s) configured to perform operations of process 900, e.g., in response to computer program instructions of the communications module 238 (e.g., operation 906). In some examples, the terminal 102 includes control unit(s) configured to perform operations of process 900, e.g., in response to computer program instructions of the caching module 218 (e.g., operations 904 or 908-918). In some examples, operation 704 can include operation 902 or be followed by operation 904, or operation 708 can be followed by at least some of operations 906-918. In some examples, operation 708 can include operation 906 or be followed by operations 908-918. In some examples, discussed below with reference to operations 902 and 904, the first network terminal 102 is configured to pull the first item of content 120. In some examples, discussed below with reference to operations 906-918, the first network terminal 102 is configured to make cached content available.

At 902, accordingly, the control unit of the control device 104 can transmit the first cache-update instruction 132 to the first network terminal 102.

At 904, the control unit of the first network terminal 102 can retrieve the first item of content 120 from content server 112. In some examples, first network terminal 102 can retrieve the first item of content 120 over a connection via network gateway 122 to content server 112. Accordingly, in some examples using operation 904, operation 708 can include, by network gateway 122, forwarding the first item of content 120 from content server 112 to first network terminal 102 in response to a request (e.g., message(s) establishing an FTP, HTTP, or other data-transfer protocol connection) from first network terminal 102. Techniques discussed herein by which network gateway 122 may retrieve the first item of content 120 can additionally or alternatively be used by first network terminal 102 at operation 904.

At 906, in some examples, the control unit of the network gateway 122 can transmit the first item of content 120 to the first network terminal 102 before a presentation time. The presentation time can be associated with the first item of content 120, e.g., as discussed herein with reference to targeting section 302.

At 908, the control unit of the first network terminal 102 can receive the first item of content 120 before the presentation time.

At 910, the control unit of the first network terminal 102 can store the first item of content 120 in a content cache to provide cached content 912. The content cache, which can represent terminal cache 126, 216, can be stored in a computer-readable medium connected with the control unit of the first network terminal 102, e.g., CRM 212.

At 914, the control unit can of the first network terminal 102 can make the cached content 912 available. For example, the cached content 912 can be made available upon storage in the content cache. Alternatively, the cached content 912 can be made available during predetermined time periods, e.g., at or after the presentation time.

In some examples, operation 914 includes receiving a query from an app running on the first network terminal 102 (e.g., client application 220), and responding to that query. For example, an OS or caching service running on first network terminal 102 can receive queries via an API (e.g., function call, syscall, or socket). The module receiving the query can respond with an indication of whether or not a requested item of content 120 is available. The module can optionally condition the response on the presentation time and a current date or time at the first network terminal 102. If the requested item of content 120 is available in the content cache (e.g., terminal cache 126) as cached content 912, the module receiving the query can provide the app with cached content 912, or with an identifier (e.g., a filesystem path) permitting access to the cached content 912. In some examples, if the item of content 120 is not available in the content cache, the app can attempt to retrieve (e.g., stream) the item of content 120 from content server 112.

In some examples, operation 914 includes or is followed by at least one of (e.g., either of, or both of) operations 916 and 918. In some examples, operation 914 includes operation 918. In some examples, operation 914 includes neither operation 916 nor operation 918. In some examples, operation 914 includes whichever of operations 916 and 918 is appropriate for particular behavior of client application 220, as discussed below.

At 916, the control unit of the first network terminal 102 can deny, before the presentation time, a request for the cached content 912. For example, the OS or caching service discussed above can receive the query, determine that the time (e.g., as known at terminal 102) is before the presentation time, and, in response, reply to the client application 220 with a notification that the content is not available.

At 918, the control unit of the first network terminal 102 can provide, at or after the presentation time, a notification that the cached content 912 is available. The notification can include, e.g., a toast, dialog box, sound, or haptic output (e.g., vibration). The notification can be provided by the OS or caching service, or by the client application 220. In some examples, the OS or caching service can notify the client application 220, and the client application 220 can, in response, present the notification.

Figure 10:
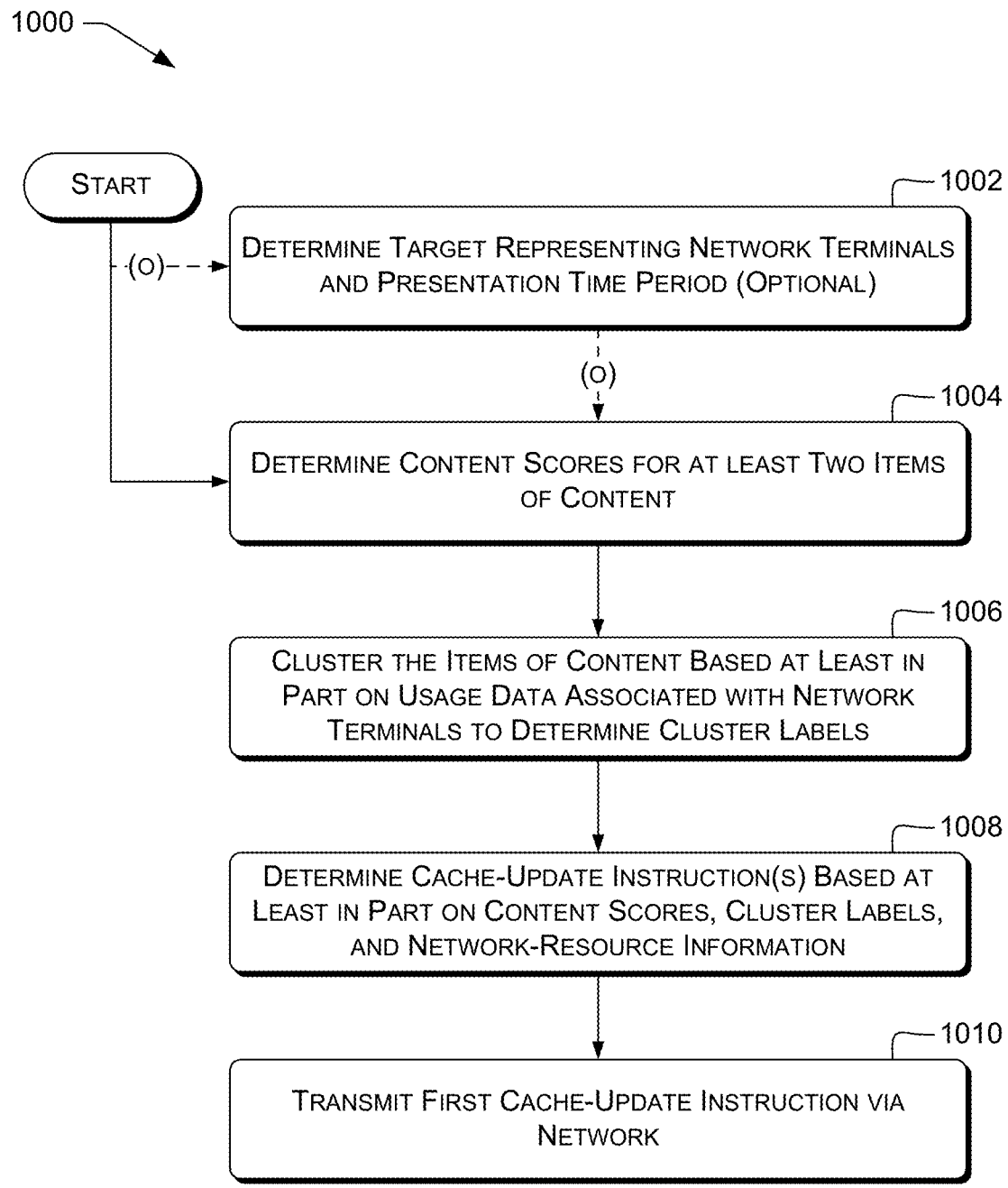
FIG. 10 illustrates example processes for determining cache-update instructions, e.g., at a control device of a telecommunications network.

FIG. 10 illustrates example processes 1000 for caching content 120 at a terminal 102. In some examples, the control device 104 includes control unit(s) configured to perform operations of processes 1000, e.g., in response to computer program instructions (e.g., instructions stored on at least one tangible, non-transitory computer-readable medium) of the instruction module 236 (e.g., operations 1002-1008) or the communications module 238 (e.g., operation 1010). Processing can begin with operation 1002 or operation 1004. Some examples omit operation 1002.

At 1002, the control unit can determine a target representing a plurality of network terminals 102 and a presentation time period. The plurality of network terminals 102 can include one or more network terminals associated with usage data 128. The plurality of network terminals 102 can consist of the one or more network terminals 102, or can include the one or more network terminals 102 and one or more additional network terminals 102. Examples are discussed herein, e.g., with reference to targeting section 302 or operations 314 or 510.

At 1004, the control unit can determine respective content scores for at least two items of content 120. Examples are discussed herein, e.g., with reference to scoring section 304 or operations 322, 406, 502, 602-604, or 802.

In some examples, operation 1004 includes determining the respective content scores 324 for the at least two items of content 120 by operating a trained scoring computational model 408 taking as input at least a portion of the usage data 128. In some of these examples, the respective content scores 324 are correlated with predictability of respective consumption patterns of the at least two items of content 120. Examples are discussed herein, e.g., with reference to scoring section 304 or operations 322, 406, 502, 602-604, or 802.

At 1006, the control unit can cluster the at least two items of content 120 based at least in part on the usage data 128 associated with the one or more network terminals to determine respective cluster labels 328 for the at least two items of content 120. Examples are discussed herein, e.g., with reference to clustering section 306 or operations 326, 504, or 804.

At 1008, the control unit can determine one or more cache-update instructions 132 based at least in part on the content scores 324, the cluster labels 328, and network-resource information. The one or more cache-update instructions 132 can include a first cache-update instruction indicating a first item of content 120 of the at least two items of content 120 and a first network terminal 102. The first network terminal 102 can be one of the one or more network terminals 102, or can be one of the plurality of network terminals 102 (operation 1002), or both, or neither.

In some examples, operation 1008 can include operating a trained prediction computational model 416 taking as input at least the cluster labels 328 and the network-resource information to provide a first prediction value associated with the first item of content 120 and a second prediction value associated with a second, different item of content of the at least two items of content 120. Operation 1008 can further include determining that the first prediction value is more favorable than the second prediction value. For example, given a prediction CM 416 trained to output higher numerical prediction values for content more likely to be consumed, operation 1008 can include determining that the first prediction value is higher than the second prediction value (e.g., in general, determining two prediction values and selecting the higher). Operation 1008 can further include determining, in response, the first cache-update instruction 132 indicating the first item of content 120 and excluding the second item of content 120. Examples are discussed herein, e.g., with reference to prediction section 308 or operations 332, 414, 506, 606-610, 702, 806, or 808.

At 1010, the control unit can transmit the first cache-update instruction via a network. Examples are discussed herein, e.g., with reference to operations 332, 512, 704, or 902.

Some examples include making predictions for specific times, e.g., to time-shift content transfer earlier than content consumption. Some of these examples use operation 1002 to determine the target representing the presentation time period. In some of these examples, the first item of content 120 is associated with the presentation time period.

In some examples, operation 1004 includes determining the respective content scores based at least in part on the usage data 128. In some examples, operation 1008 includes determining the one or more cache-update instructions so that each of the one or more cache-update instructions is associated with at least one network terminal of the plurality of network terminals. In some examples, operation 1010 includes transmitting the first cache-update instruction before the presentation time period. Examples are discussed herein, e.g., with reference to targeting section 302 or operations 314, 332, 508, 510, 708, or 906.

Example Clauses

A: A method comprising: determining respective content scores for at least two items of content; clustering the at least two items of content based at least in part on usage data associated with one or more network terminals to determine respective cluster labels for the at least two items of content; determining one or more cache-update instructions based at least in part on the content scores, the cluster labels, and network-resource information, wherein: the one or more cache-update instructions comprise a first cache-update instruction to transmit a first item of content of the at least two items of content to a first network terminal; and transmitting, to the first network terminal via a cellular network in response to the first cache-update instruction, the first item of content.

B: The method according to paragraph A, wherein: the first item of content is associated with a presentation time period; the first cache-update instruction is associated with a transfer time period; the transfer time period at least partly precedes the presentation time period; and the method comprises transmitting the first item of content to the first network terminal via the cellular network at least partly during the transfer time period.

C: The method according to paragraph A or B, further comprising: determining a target representing a plurality of network terminals and a presentation time period, the plurality of network terminals comprising the one or more network terminals; determining the respective content scores based at least in part on the usage data; and determining the one or more cache-update instructions, wherein each of the one or more cache-update instructions is associated with at least one network terminal of the plurality of network terminals; wherein the first item of content is associated with the presentation time period.

D: The method according to paragraph C, further comprising: determining a trained scoring neural network configured to output the respective content scores, wherein the trained scoring neural network is determined based at least in part on: scoring-training data indicating consumption of content items by network terminals; and a predetermined loss function configured to drive training so that the trained scoring neural network outputs more favorable content scores for items of content that are consumed more consistently at network terminals of the plurality of network terminals than for items of content that are consumed less consistently at network terminals of the plurality of network terminals; and determining the respective content scores at least partly by operating the trained scoring neural network.

E: The method according to paragraph C or D, further comprising: determining a trained prediction neural network configured to output prediction values, wherein the trained prediction neural network is determined based at least in part on: identification information of network terminal(s) for which prediction values are to be determined; at least: the presentation time period; or a transfer time period that at least partly precedes the presentation time period; and a predetermined loss function configured to drive training so that the trained scoring neural network outputs more favorable prediction values for items of content that are more likely to be consumed at network terminals of the plurality of network terminals during the presentation time period than for items of content that are less likely to be consumed at network terminals of the plurality of network terminals during the presentation time period; determining the prediction values at least partly by operating the trained prediction neural network; and determining the one or more cache-update instructions based at least in part on the prediction values.

F: The method according to any of paragraphs A-E, wherein: the one or more cache-update instructions further comprise a second cache-update instruction selected from the group consisting of: an instruction to remove a second item of content of the at least two items of content from the first network terminal; and an instruction to clear a cache of content items at the first network terminal; and the method further comprises transmitting the second cache-update instruction to the first network terminal via the cellular network.

G: The method according to any of paragraphs A-F, wherein the first item of content is selected from the group consisting of: a video recording, an audio recording, virtual-reality (VR) geometry data, an augmented-reality (AR) overlay, a firmware update associated with the first network terminal, a configuration-parameters update associated with the first network terminal, an operating-system update associated with the first network terminal, and an app update associated with software installed on the first network terminal.

H: A system, comprising: a control device having a control unit configured to perform first operations comprising: determining one or more cache-update instructions at least partly by operating one or more trained computational models, the one or more cache-update instructions comprising a first cache-update instruction indicating: a first item of content of at least two items of content; and a first network terminal; and transmitting the first cache-update instruction via a network; and a network gateway having a control unit configured to perform second operations comprising: receiving the first item of content from a content server; and after the control device transmits the first cache-update instruction, transmitting the first item of content to the first network terminal.

I: The system according to paragraph H, wherein the first operations comprise determining the one or more cache-update instructions at least partly by: operating a trained scoring computational model of the one or more computational models to determine a plurality of content scores, each content score associated with a respective item of the at least two items of content; clustering the at least two items of content based at least in part on usage data associated with one or more network terminals to determine respective cluster labels for the at least two items of content; operating a trained prediction computational model of the one or more computational models to determine prediction values associated with the first network terminal based at least in part on the content scores, the cluster labels, and network-resource information; and determining the first cache-update instruction based at least in part on at least one of the prediction values.

J: The system according to paragraph H or I, wherein: the first cache-update instruction further indicates a second network terminal; and the system further comprises a wireless base station configured to perform third operations comprising: receiving the first item of content from the network gateway; and transmitting the first item of content substantially concurrently to both the first network terminal and the second network terminal via a wireless broadcast.

K: The system according to any of paragraphs H-J, wherein: the first item of content is associated with a presentation time period; the first cache-update instruction is associated with a transfer time period; the transfer time period at least partly precedes the presentation time period; and the second operations comprise transmitting the first item of content to the first network terminal at least partly during the transfer time period.

L: The system according to any of paragraphs H-K, wherein: the system comprises a content server having a control unit configured to perform fourth operations; the first operations comprise transmitting the first cache-update instruction to the content server; and the fourth operations comprise transmitting the first item of content to the network gateway in a transmission associated with the first network terminal.

M: The system according to any of paragraphs H-L, wherein: the first operations comprise transmitting the first cache-update instruction to the network gateway; and the second operations comprise: retrieving the first item of content from a content server; and in response to the first cache-update instruction, transmitting the first item of content to the first network terminal.

N: The system according to any of paragraphs H-M, wherein: the system comprises the first network terminal having a control unit configured to perform fifth operations; the first operations comprise transmitting the first cache-update instruction to the first network terminal; and the fifth operations comprise, in response to the first cache-update instruction, retrieving the first item of content from a content server.

O: The system according to any of paragraphs H-N, wherein: the system comprises the first network terminal having: a control unit configured to perform sixth operations; and a computer-readable medium connected with the control unit and storing a content cache; the first item of content is associated with a presentation time; the second operations comprise transmitting the first item of content to the first network terminal before the presentation time; and the sixth operations comprise: receiving the first item of content before the presentation time; storing the first item of content in the content cache to provide cached content; and making the cached content available at or after the presentation time.

P: The system according to any of paragraphs H-O, wherein the sixth operations further comprise at least: denying, before the presentation time, a request for the cached content; or providing, at or after the presentation time, a notification that the cached content is available.

Q: At least one tangible, non-transitory computer-readable medium comprising instructions that, when executed by at least one processor, cause the at least one processor to perform operations comprising: determining respective content scores for at least two items of content; clustering the at least two items of content based at least in part on usage data associated with one or more network terminals to determine respective cluster labels for the at least two items of content; determining one or more cache-update instructions based at least in part on the content scores, the cluster labels, and network-resource information, wherein the one or more cache-update instructions comprise a first cache-update instruction indicating: a first item of content of at least two items of content; and a first network terminal; and transmitting the first cache-update instruction via a network.

R: The at least one tangible, non-transitory computer-readable medium as recited in paragraph Q, the operations further comprising: determining a target representing a plurality of network terminals and a presentation time period, the plurality of network terminals comprising the one or more network terminals; determining the respective content scores based at least in part on the usage data; and determining the one or more cache-update instructions, wherein: each of the one or more cache-update instructions is associated with at least one network terminal of the plurality of network terminals; and the first item of content is associated with the presentation time period; and transmitting the first cache-update instruction before the presentation time period.

S: The at least one tangible, non-transitory computer-readable medium as recited in paragraph Q or R, the operations further comprising determining the respective content scores for the at least two items of content by operating a trained scoring computational model taking as input at least a portion of the usage data, wherein the respective content scores are correlated with predictability of respective consumption patterns of the at least two items of content.

T: The at least one tangible, non-transitory computer-readable medium as recited in any of paragraphs Q-S, the operations further comprising: operating a trained prediction computational model taking as input at least the cluster labels and the network-resource information to provide a first prediction value associated with the first item of content and a second prediction value associated with a second, different item of content of the at least two items of content; determining that the first prediction value is more favorable than the second prediction value; and in response, determining the first cache-update instruction indicating the first item of content and excluding the second item of content.

U: A system comprising: a network gateway configured to transmit the first item of content as recited in any of paragraphs A-G and a control device configured to perform the remaining functions recited in any of paragraphs A-G.

V: A computer-readable medium, e.g., a computer storage medium, having thereon computer-executable instructions, the computer-executable instructions upon execution configuring a computer to perform operations as any of paragraphs A-G, H-P, or Q-T recites.

W: A device comprising: a processor; and a computer-readable medium, e.g., a computer storage medium, having thereon computer-executable instructions, the computer-executable instructions upon execution by the processor configuring the device to perform operations as any of paragraphs A-G, H-P, or Q-T recites.

X: A system comprising: means for processing; and means for storing having thereon computer-executable instructions, the computer-executable instructions including means to configure the system to carry out operations as any of paragraphs A-G, H-P, or Q-T recites.

Y: A network control device configured to perform operations as any of paragraphs A-G, H-P, or Q-T recites.

Z: A method comprising performing operations as any of paragraphs A-G, H-P, or Q-T recites.

AA: A network gateway configured to perform corresponding operations recited in any of paragraphs H-P.

AB: A wireless base station configured to perform corresponding operations recited in paragraph J.

AC: A network terminal configured to perform corresponding operations recited in any of paragraphs N-P.

Conclusion

In the figures, example data transmissions (parallelograms), example data exchanges in call flow diagrams, and example blocks in process diagrams represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the transmissions are described is not intended to be construed as a limitation, and any number of the described transmissions can be combined in any order and/or in parallel to implement the processes.

Many variations and modifications can be made to the above-described examples, the elements of which are to be understood as being among other acceptable examples. All such modifications and variations are intended to be included herein within the scope of this disclosure and protected by the claims. Moreover, this disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

The methods, processes, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS). In other instances, the functionality and/or modules may be implemented as part of a device driver, firmware, application, or other software subsystem.

Example computer-implemented operations described herein can additionally or alternatively be embodied in specialized computer hardware, e.g., FPGAs. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

In the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. A method comprising:
   determining a trained scoring neural network configured to output one or more content scores, wherein the trained scoring neural network is determined based at least in part on:
   scoring-training data indicating consumption of items of content by one or more network terminals; and
   a predetermined loss function configured to drive training so that the trained scoring neural network outputs more favorable content scores for items of content that are consumed more consistently at the one or more network terminals than for items of content that are consumed less consistently at the one or more network terminals;
   determining at least two content scores of the one or more content scores for at least two items of content at least partly by operating the trained scoring neural network;
   clustering the at least two items of content based at least in part on usage data associated with one or more network terminals to determine respective cluster labels for the at least two items of content;
   determining one or more cache-update instructions based at least in part on the content scores, the cluster labels, and network-resource information, wherein:
   the one or more cache-update instructions comprise a first cache-update instruction to transmit a first item of content of the at least two items of content to a first network terminal; and
   transmitting, to the first network terminal via a cellular network in response to the first cache-update instruction, the first item of content.

2. The method according to claim 1, wherein:
   the first item of content is associated with a presentation time period;
   the first cache-update instruction is associated with a transfer time period;
   the transfer time period at least partly precedes the presentation time period; and
   the method comprises transmitting the first item of content to the first network terminal via the cellular network at least partly during the transfer time period.

3. The method according to claim 1, wherein:
   the one or more cache-update instructions further comprise a second cache-update instruction selected from the group consisting of:
   an instruction to remove a second item of content of the at least two items of content from the first network terminal; and
   an instruction to clear a cache of content items at the first network terminal; and
   the method further comprises transmitting the second cache-update instruction to the first network terminal via the cellular network.

4. The method according to claim 1, wherein the first item of content is selected from the group consisting of: a video recording, an audio recording, virtual-reality (VR) geometry data, an augmented-reality (AR) overlay, a firmware update associated with the first network terminal, a configuration-parameters update associated with the first network terminal, an operating-system update associated with the first network terminal, and an app update associated with software installed on the first network terminal.

5. The method according to claim 1, further comprising:
   determining a target representing a plurality of network terminals and a presentation time period, the plurality of network terminals comprising the one or more network terminals;
   determining the at least two content scores based at least in part on the usage data; and
   determining the one or more cache-update instructions, wherein each of the one or more cache-update instructions is associated with at least one network terminal of the plurality of network terminals;
   wherein the first item of content is associated with the presentation time period.

6. The method according to claim 5, further comprising:
   determining a trained prediction neural network configured to output prediction values, wherein the trained prediction neural network is determined based at least in part on:
   identification information of network terminal(s) for which prediction values are to be determined;
   at least:
   the presentation time period; or
   a transfer time period that at least partly precedes the presentation time period; and
   a predetermined loss function configured to drive training so that the trained scoring neural network outputs more favorable prediction values for items of content that are more likely to be consumed at network terminals of the plurality of network terminals during the presentation time period than for items of content that are less likely to be consumed at network terminals of the plurality of network terminals during the presentation time period;
   determining the prediction values at least partly by operating the trained prediction neural network; and
   determining the one or more cache-update instructions based at least in part on the prediction values.

7. A system, comprising:
   a control device having a control unit configured to perform first operations comprising:
   determining one or more cache-update instructions at least partly by:
   operating a trained scoring computational model of the one or more computational models to determine a plurality of content scores, each content score of the plurality of content scores is associated with a respective item of the at least two items of content;
   clustering the at least two items of content based at least in part on usage data associated with one or more network terminals to determine respective cluster labels for the at least two items of content;
   operating a trained prediction computational model of the one or more computational models to determine prediction values associated with the first network terminal based at least in part on the content scores, the cluster labels, and network-resource information; and
   determining the first cache-update instruction based at least in part on at least one of the prediction values;

the one or more cache-update instructions comprising a first cache-update instruction indicating:
a first item of content of at least two items of content; and
a first network terminal; and
transmitting the first cache-update instruction via a network; and
a network gateway having a control unit configured to perform second operations comprising:
receiving the first item of content from a content server; and
after the control device transmits the first cache-update instruction, transmitting the first item of content to the first network terminal.

8. The system according to claim 7, wherein:
the first cache-update instruction further indicates a second network terminal; and
the system further comprises a wireless base station configured to perform third operations comprising:
receiving the first item of content from the network gateway; and
transmitting the first item of content to both the first network terminal and the second network terminal via a wireless broadcast.

9. The system according to claim 7, wherein:
the first item of content is associated with a presentation time period;
the first cache-update instruction is associated with a transfer time period;
the transfer time period at least partly precedes the presentation time period; and
the second operations comprise transmitting the first item of content to the first network terminal at least partly during the transfer time period.

10. The system according to claim 7, wherein:
the system comprises a content server having a control unit configured to perform fourth operations;
the first operations comprise transmitting the first cache-update instruction to the content server; and
the fourth operations comprise transmitting the first item of content to the network gateway in a transmission associated with the first network terminal.

11. The system according to claim 7, wherein:
the first operations comprise transmitting the first cache-update instruction to the network gateway; and
the second operations comprise:
retrieving the first item of content from a content server; and
in response to the first cache-update instruction, transmitting the first item of content to the first network terminal.

12. The system according to claim 7, wherein:
the system comprises the first network terminal having a control unit configured to perform fifth operations;
the first operations comprise transmitting the first cache-update instruction to the first network terminal; and
the fifth operations comprise, in response to the first cache-update instruction, retrieving the first item of content from a content server.

13. The system according to claim 7, wherein:
the system comprises the first network terminal having:
a control unit configured to perform sixth operations; and
a computer-readable medium connected with the control unit and storing a content cache;
the first item of content is associated with a presentation time;
the second operations comprise transmitting the first item of content to the first network terminal before the presentation time; and
the sixth operations comprise:
receiving the first item of content before the presentation time;
storing the first item of content in the content cache to provide cached content; and
making the cached content available at or after the presentation time.

14. The system according to claim 7, wherein the sixth operations further comprise at least:
denying, before the presentation time, a request for the cached content; or
providing, at or after the presentation time, a notification that the cached content is available.

15. The system according to claim 7, wherein the network gateway comprises a Long-Term Evolution (LTE) packet data network (PDN) gateway.

16. The system according to claim 7, wherein the network terminal device comprises a user equipment in cellular communication with the network gateway.

17. The system according to claim 7, wherein the trained scoring computational module considers a percentage of user terminals that have consumed the first item of content to determine the plurality of content scores.

18. At least one tangible, non-transitory computer-readable medium comprising instructions that, when executed by at least one processor, cause the at least one processor to perform operations comprising:
determining at least two content scores for at least two items of content;
clustering the at least two items of content based at least in part on usage data associated with one or more network terminals to determine the at least two cluster labels for the at least two items of content;
determining one or more cache-update instructions based at least in part on the content scores, the cluster labels, and network-resource information, wherein the one or more cache-update instructions comprise a first cache-update instruction indicating a first network terminal;
operating a trained prediction computational model taking as input at least the cluster labels and the network-resource information to provide a first prediction value associated with the first item of content and a second prediction value associated with a second, different item of content of the at least two items of content;
determining that the first prediction value is more favorable than the second prediction value, wherein, in response, the first cache-update instruction indicates a first item of content of the at least two items of content and excludes a second item of content of the at least two items of content; and
transmitting the first cache-update instruction via a network.

19. The at least one tangible, non-transitory computer-readable medium as recited in claim 18, the operations further comprising:
determining a target representing a plurality of network terminals and a presentation time period, the plurality of network terminals comprising the one or more network terminals;
determining the at least two content scores based at least in part on the usage data; and
determining the one or more cache-update instructions, wherein:

each of the one or more cache-update instructions is associated with at least one network terminal of the plurality of network terminals; and the first item of content is associated with the presentation time period; and transmitting the first cache-update instruction before the presentation time period.

20. The at least one tangible, non-transitory computer-readable medium according to claim 18, the operations further comprising determining the at least two content scores for the at least two items of content by operating a trained scoring computational model taking as input at least a portion of the usage data, wherein the at least two content scores are correlated with predictability of respective consumption patterns of the at least two items of content.

* * * * *